US012512886B2

(12) United States Patent
Chandwani et al.

(10) Patent No.: US 12,512,886 B2
(45) Date of Patent: Dec. 30, 2025

(54) BEAMFORMING AND INTERFERENCE MITIGATION TECHNIQUES FOR MASSIVE MIMO UPLINK AND DOWNLINK IN O-RAN 7-2 COMPATIBLE BASE STATIONS

(71) Applicant: Intel Corporation, Santa Clara, CA (US)

(72) Inventors: Neelam Chandwani, Portland, OR (US); Thushara Hewavithana, Tempe (GB); Peng Lu, Elk Grove, CA (US); Bishwarup Mondal, San Ramon, CA (US); Avik Sengupta, San Jose, CA (US); Michael Beadle, Tustin, CA (US); Ranjit Cavatur, Laguna Niguel, CA (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 17/979,397

(22) Filed: Nov. 2, 2022

(65) Prior Publication Data

US 2024/0154658 A1 May 9, 2024

(51) Int. Cl.
*H04B 7/06* (2006.01)
*H04L 5/00* (2006.01)

(52) U.S. Cl.
CPC ......... *H04B 7/0617* (2013.01); *H04L 5/0051* (2013.01)

(58) Field of Classification Search
CPC ............................ H04B 7/0617; H04L 5/0051
See application file for complete search history.

(56) References Cited

U.S. PATENT DOCUMENTS

2022/0150855 A1* 5/2022 Bai ..................... H04W 56/001
2024/0097943 A1* 3/2024 Gupta ................. H04B 7/0456

FOREIGN PATENT DOCUMENTS

| CN | 108134624 A | * | 6/2018 | |
| JP | 2010246113 A | * | 10/2010 | ............. H04B 7/024 |
| WO | WO-2023211323 A1 | * | 11/2023 | ........... H04B 7/0617 |

* cited by examiner

*Primary Examiner* — Mohammad S Adhami
*Assistant Examiner* — Samuel Dilan Rutnam
(74) *Attorney, Agent, or Firm* — Schwegman Lundberg & Woessner, P.A.

(57) ABSTRACT

An apparatus for use in an O-RAN base station includes processing circuitry. To configure the O-RAN base station for signal processing in an O-RAN network, the processing circuitry is to decode an SRS and a DMRS in a UL stream received from at least one UE. Channel estimation is performed based on the SRS to obtain a channel estimate matrix of channel estimates associated with reception of the UL stream. A noise covariance is generated using the DMRS. Beamforming weights are determined using the channel estimate matrix and the noise covariance. Beamforming is performed on UL data corresponding to the UL stream to generate beamformed data streams. The beamforming is based on applying the beamforming weights to the UL data.

20 Claims, 19 Drawing Sheets

| SRS PORT | ANTENNA PORT | SRS PORT | ANTENNA PORT |
|---|---|---|---|
| 0 | A0.H | 16 | A0.V |
| 1 | A1.H | 17 | A1.V |
| 2 | A2.H | 18 | A2.V |
| 3 | A3.H | 19 | A3.V |
| 4 | A4.H | 20 | A4.V |
| 5 | A5.H | 21 | A5.V |
| 6 | A6.H | 22 | A6.V |
| 7 | A7.H | 23 | A7.V |
| 8 | B0.H | 24 | B0.V |
| 9 | B1.H | 25 | B1.V |
| 10 | B2.H | 26 | B2.V |
| 11 | B3.H | 27 | B3.V |
| 12 | B4.H | 28 | B4.V |
| 13 | B5.H | 29 | B5.V |
| 14 | B6.H | 30 | B6.V |
| 15 | B7.H | 31 | B7.V |

SRS PORT <—> ANTENNA PORT MAPPING

FIG. 14

BEAMFORMING AND INTERFERENCE MITIGATION TECHNIQUES FOR MASSIVE MIMO UPLINK AND DOWNLINK IN O-RAN 7-2 COMPATIBLE BASE STATIONS

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to Open RAN (O-RAN) architectures and, more specifically, beamforming and interference mitigation techniques for massive multiple-inputs-multiple-outputs (MIMO) uplink (UL) and downlink (DL) in O-RAN base stations (e.g., O-RAN 7-2 compatible base stations). Yet additional aspects are related to physical downlink shared channel (PDSCH) beamforming weight generation based on grid-of-beams (GoB) formed using a discrete Fourier transform (DFT) codeword.

BACKGROUND

Mobile communications have evolved significantly from early voice systems to today's highly sophisticated integrated communication platform. With the increase in different types of devices communicating with various network devices, the usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next-generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As the current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE and NR systems in the licensed, as well as unlicensed spectrum, is expected in future releases and 5G systems such as O-RAN systems. Such enhanced operations can include techniques for beamforming and interference mitigation techniques for massive MIMO UL and DL in O-RAN base stations (e.g., O-RAN 7-2 compatible base stations).

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 13 and FIG. 14 illustrate antenna element ordering, in accordance with some aspects.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
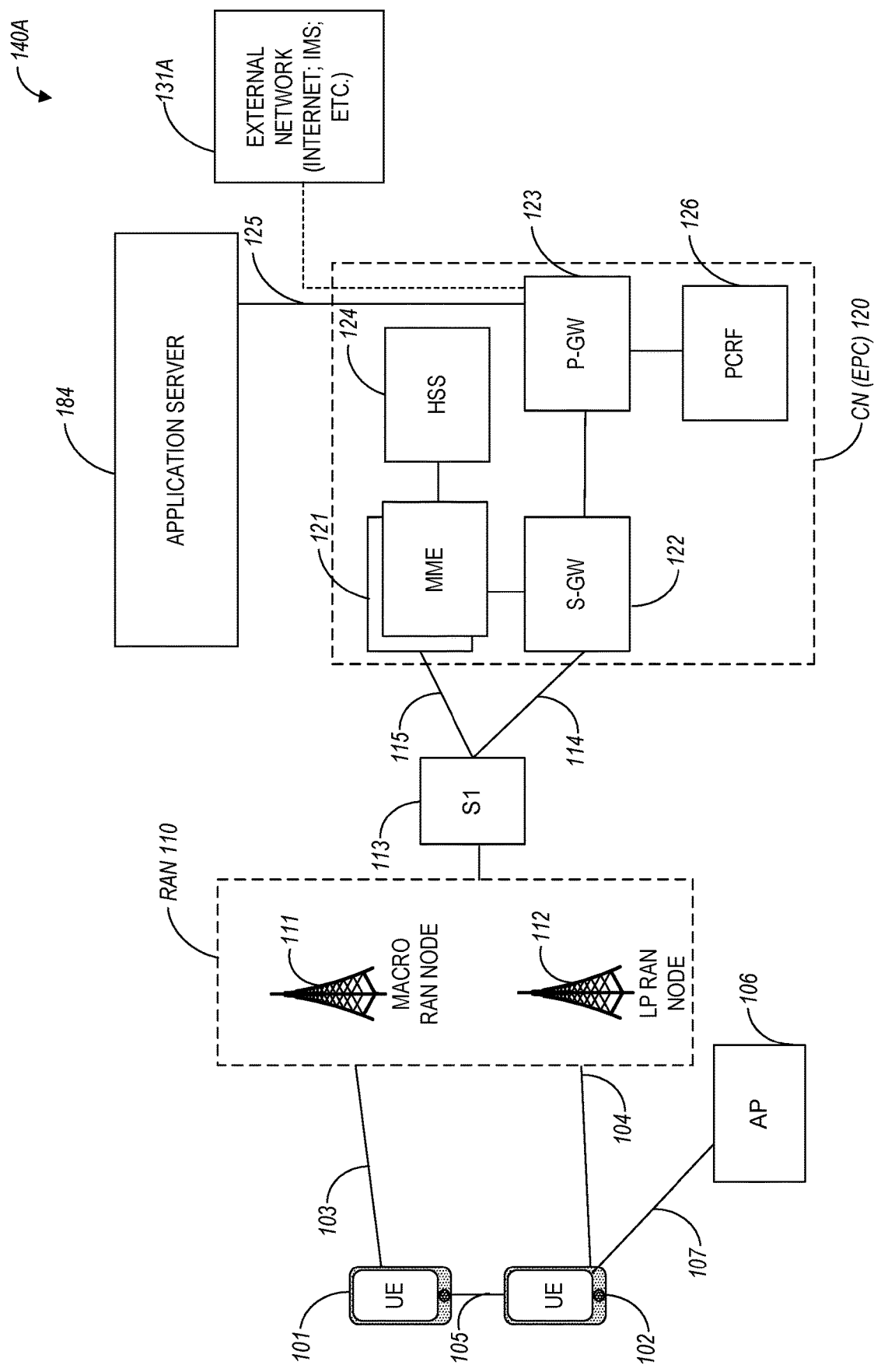
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
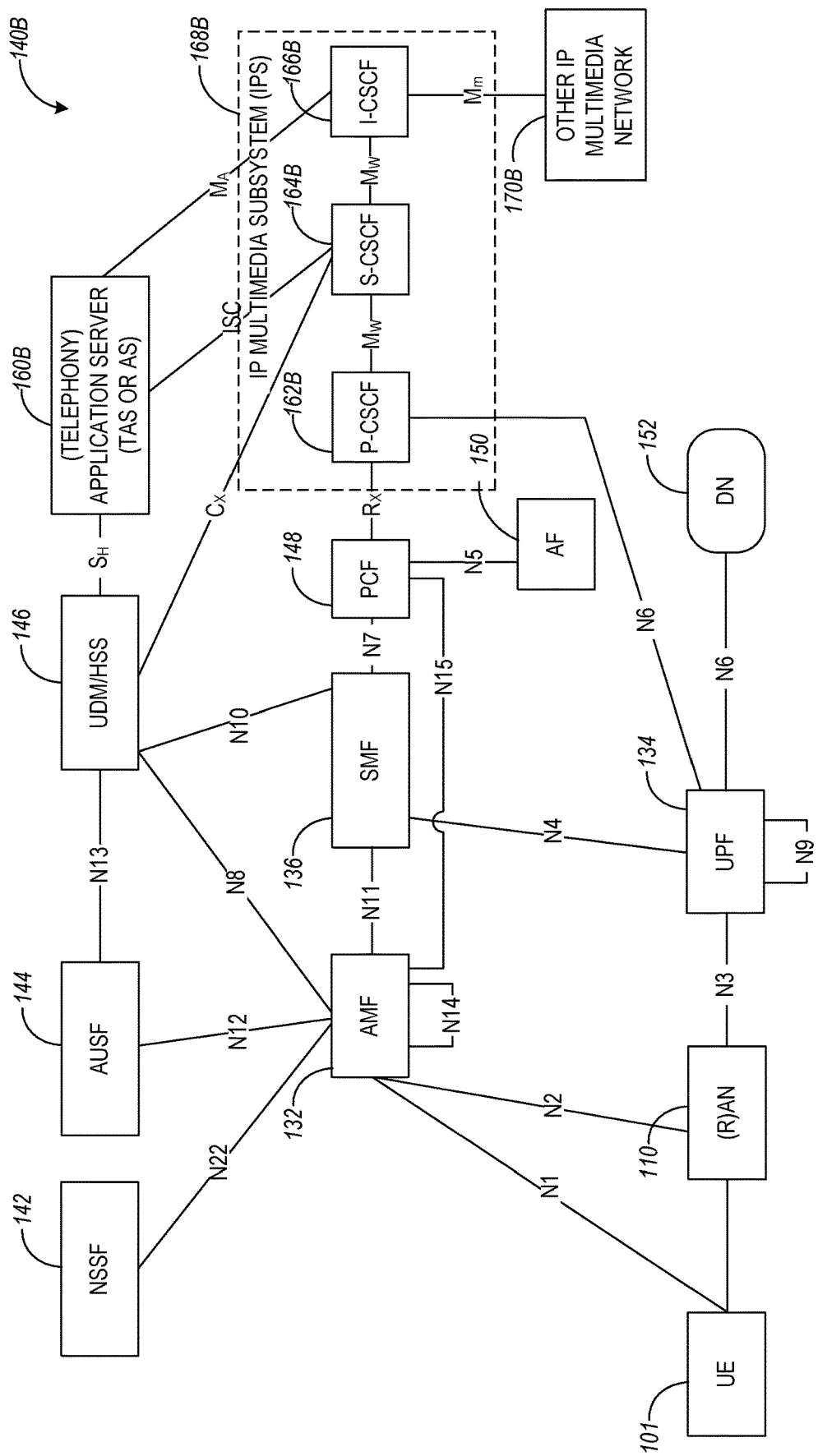
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
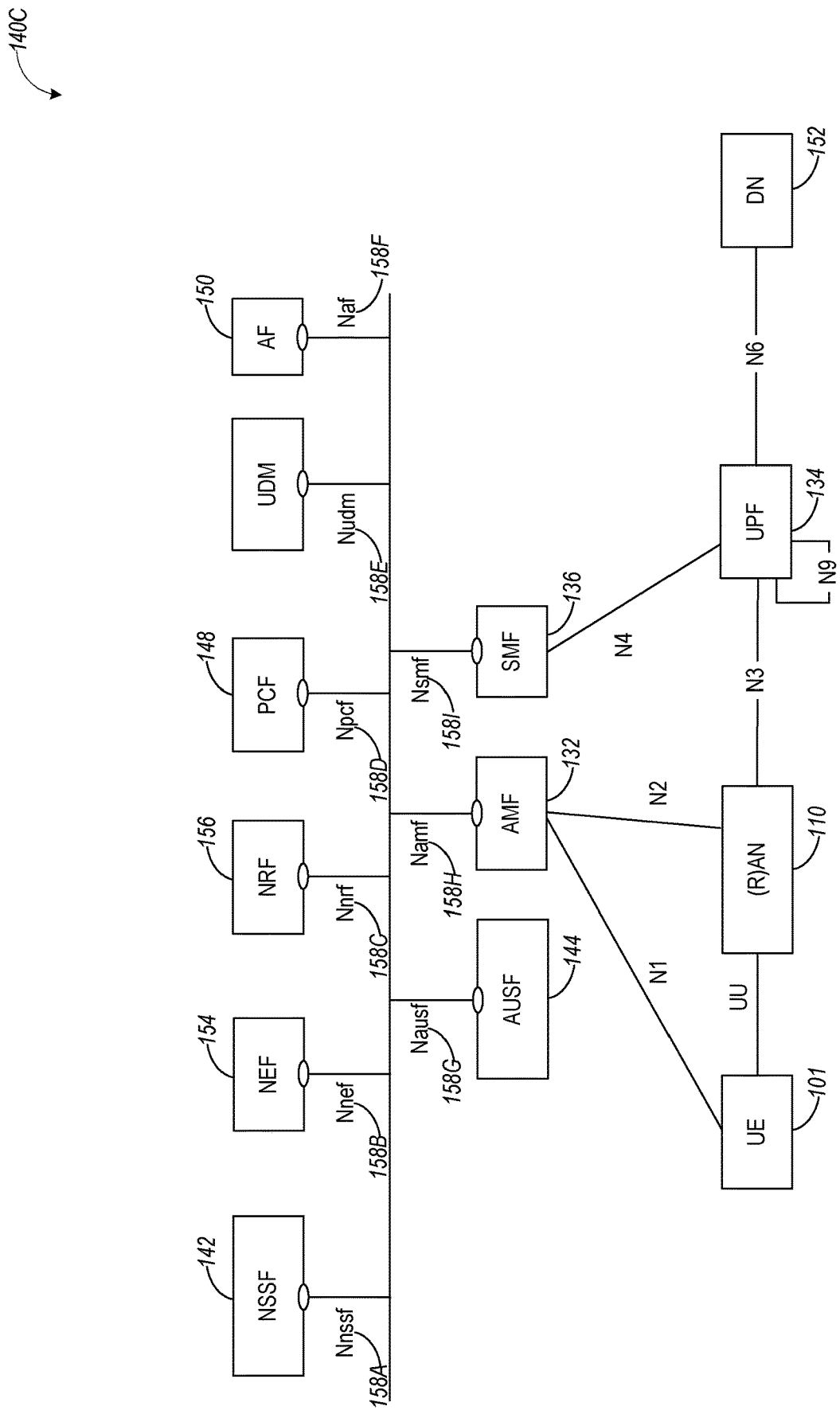

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
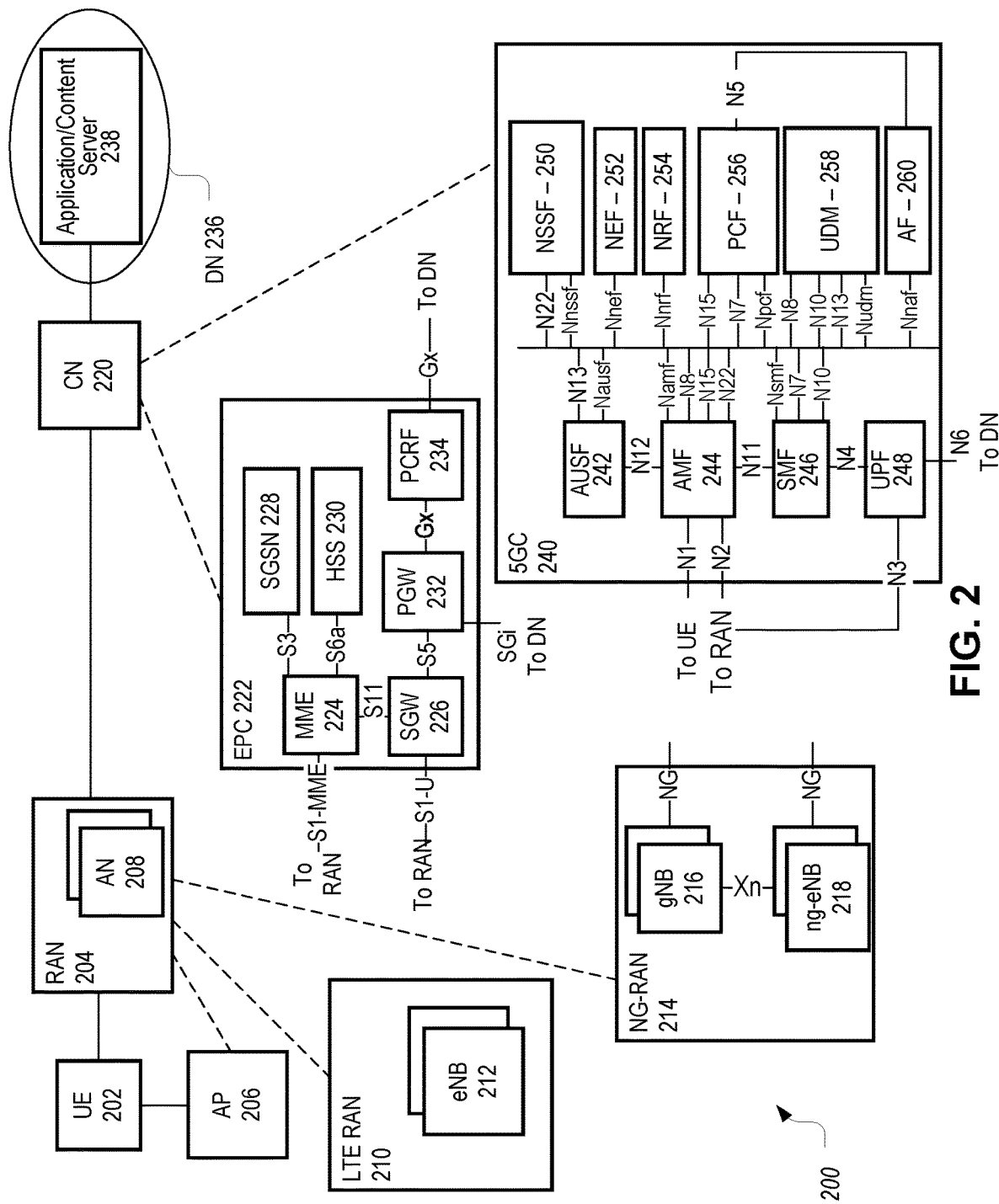
FIG. 2, FIG. 3, and FIG. 4 illustrate various systems, devices, and components that may implement aspects of disclosed embodiments.
Figure 3:
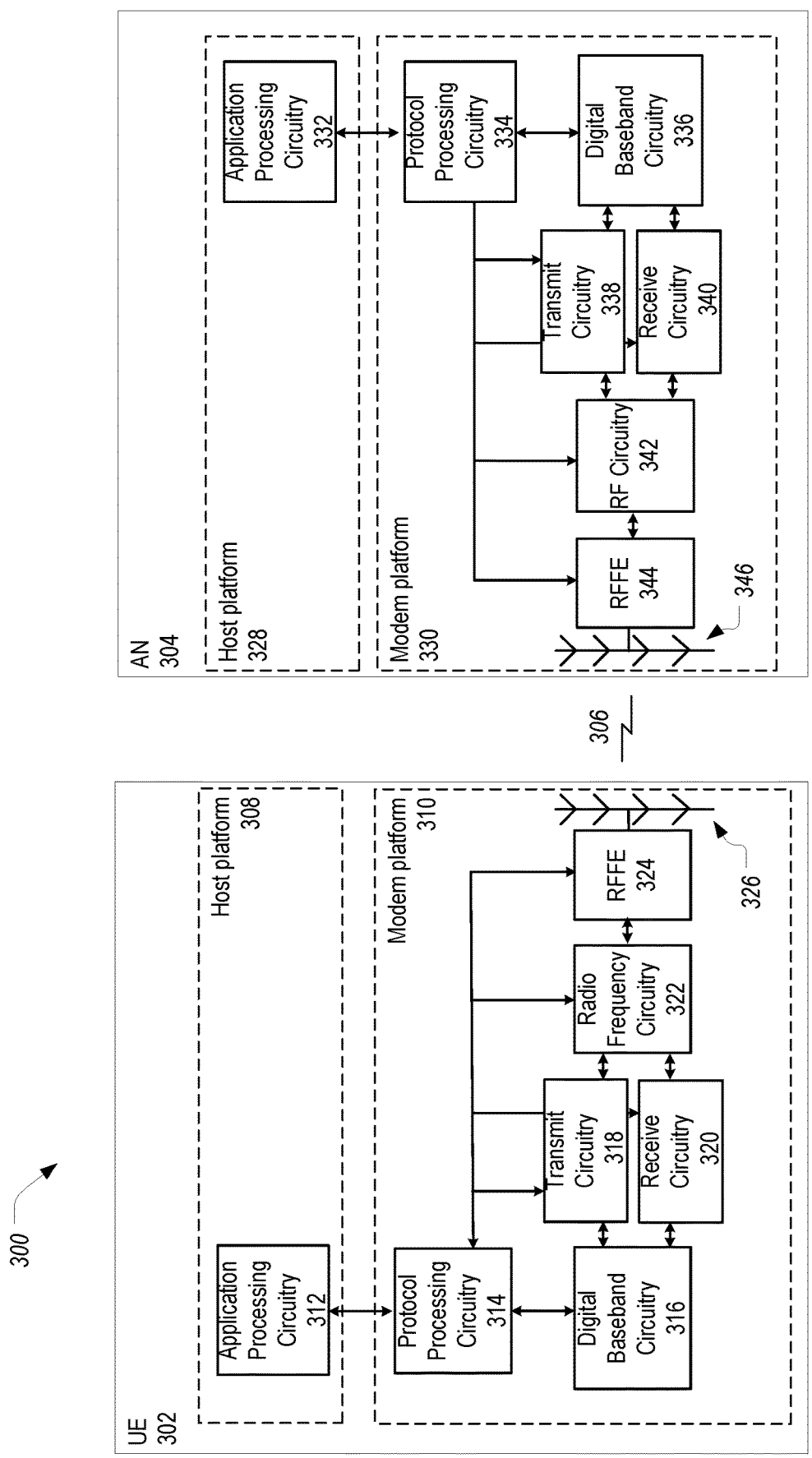
Figure 4:
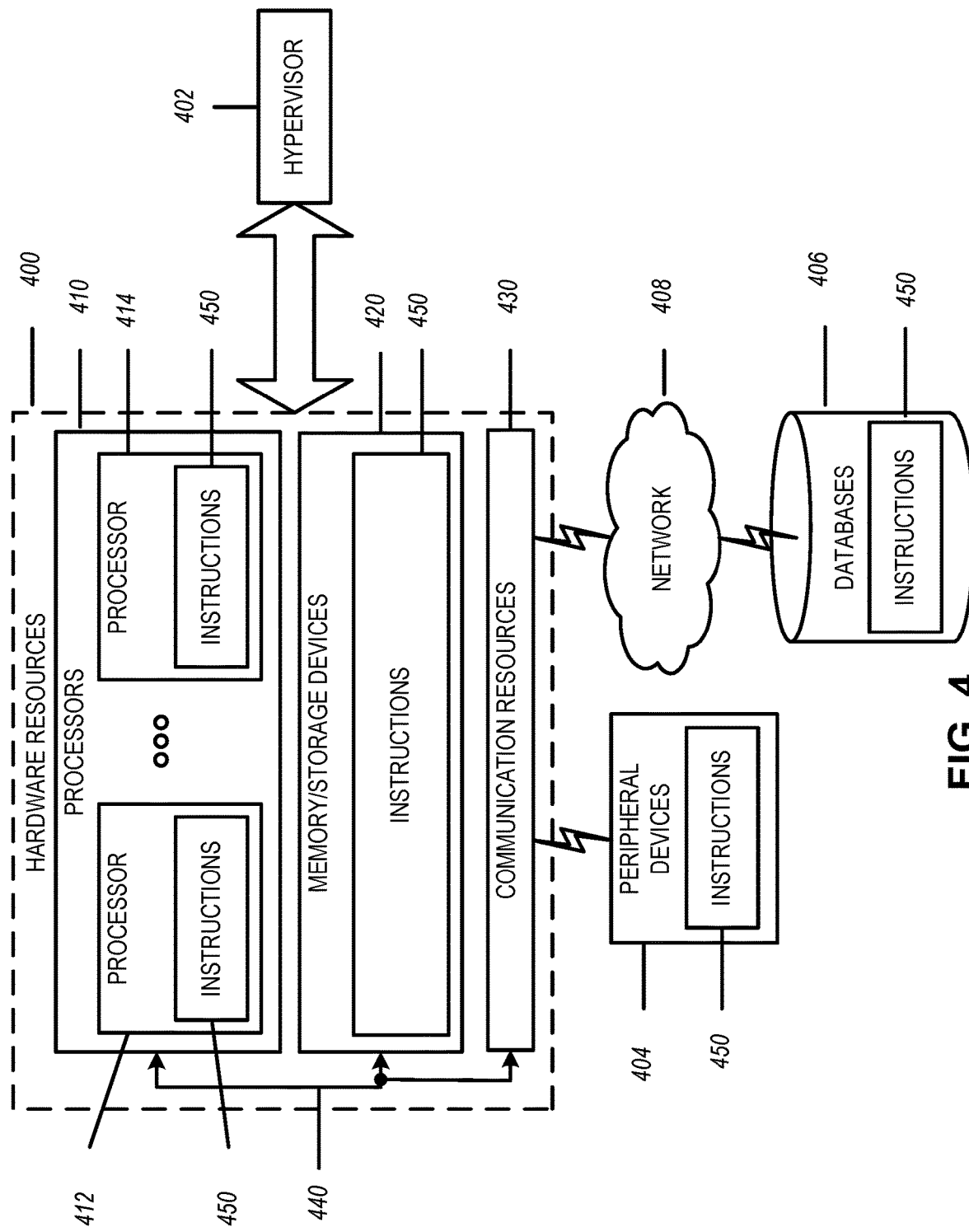

FIG. 2, FIG. 3, and FIG. 4 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, and media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM, and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include an SSB which is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 which includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS), which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/ content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for the provision of IMS services. The PGW 232 may be coupled with a PCRF 234 via a Gx reference point.

The PCRF 234 is the policy and charging control element of the LTE CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for the authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide information on the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant to policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, and application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. Connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate the transmission or reception of data via connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred to generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with the like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

Processorscessors 410 may include, for example, processor 412 and processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The term "application" may refer to a complete and deployable package, or environment to achieve a certain function in an operational environment. The term "AI/ML application" or the like may be an application that contains some artificial intelligence (AI)/machine learning (ML) models and application-level descriptions.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific to an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML host informs the actor about the output of the ML algorithm, and the actor decides on an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

Figure 5:
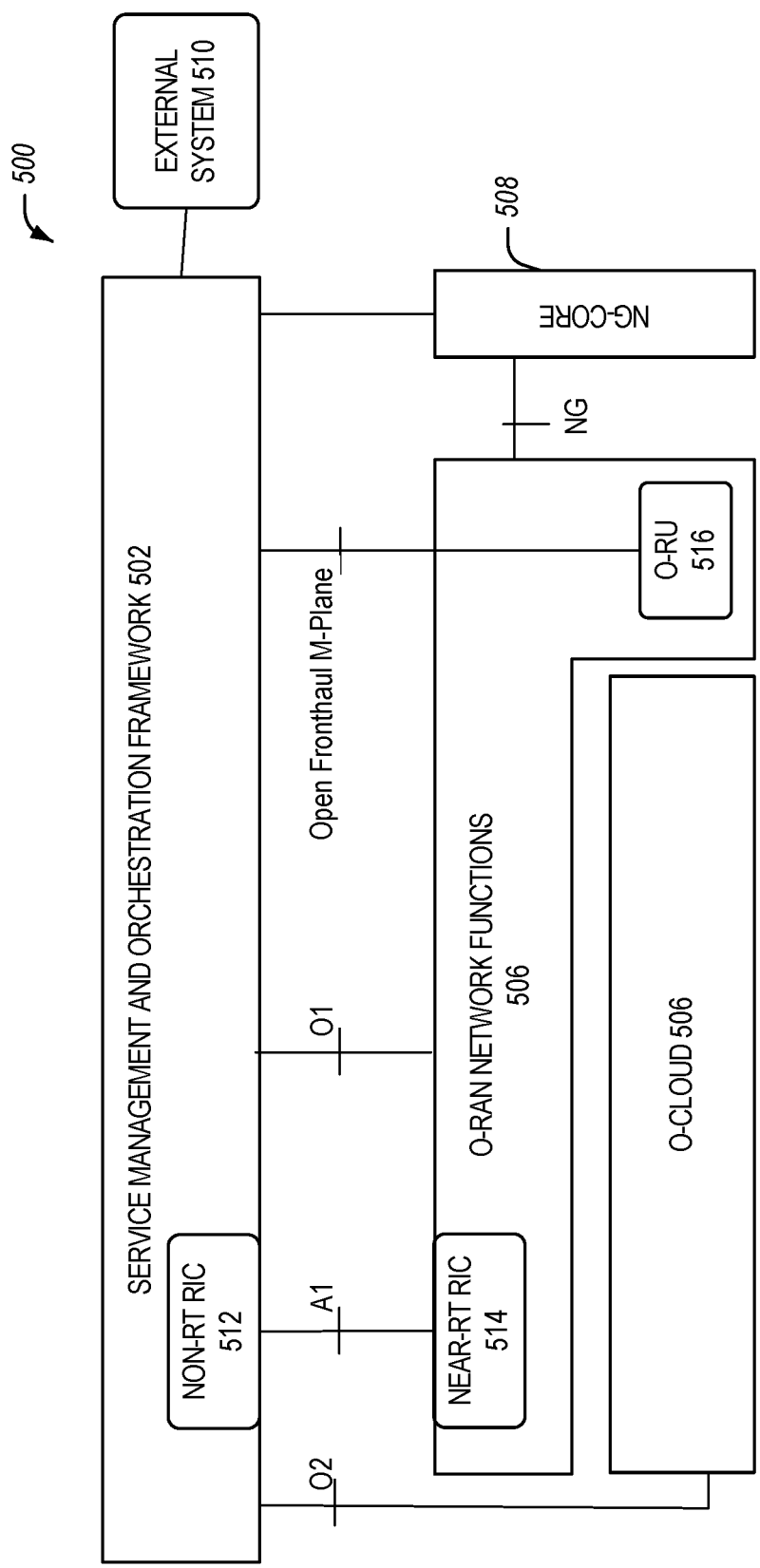
FIG. 5 illustrates an example of an Open RAN (O-RAN) system architecture, in accordance with some aspects.

FIG. 5 provides a high-level view of an Open RAN (O-RAN) architecture 500. The O-RAN architecture 500 includes four O-RAN defined interfaces—namely, the A1 interface, the O1 interface, the O2 interface, and the Open Fronthaul Management (M)-plane interface—which connect the Service Management and Orchestration (SMO) framework 502 to O-RAN network functions (NFs) 504 and the O-Cloud 506. The SMO 502 (described in [O13]) also connects with an external system 510, which provides additional configuration data to the SMO 502. FIG. 5 also illustrates that the A1 interface connects the O-RAN Non-Real Time (RT) RAN Intelligent Controller (RIC) 512 in or at the SMO 502 and the O-RAN Near-RT RIC 514 in or at the O-RAN NFs 504. The O-RAN NFs 504 can be virtualized network functions (VNFs) such as virtual machines (VMs) or containers, sitting above the O-Cloud 506 and/or Physical Network Functions (PNFs) utilizing customized hardware. All O-RAN NFs 504 are expected to support the O1 interface when interfacing with the SMO framework 502. The O-RAN NFs 504 connect to the NG-Core 508 via the NG interface (which is a 3GPP-defined interface). The Open Fronthaul M-plane interface between the O-RAN Distributed Unit (DU) and the O-RAN Radio Unit (O-RU) 516 supports the O-RU 516 management in the O-RAN hybrid model as specified in [O16]. The O-RU's termination of the Open Fronthaul M-plane interface is an optional interface to the SMO 502 that is included for backward compatibility purposes as per and is intended for management of the O-RU 516 in hybrid mode only. The management architecture of flat mode and its relation to the O1 interface for the O-RU 516 is for future study. The O-RU 516 termination of the O1 interface towards the SMO 502 is specified in [O12].

Figure 6:
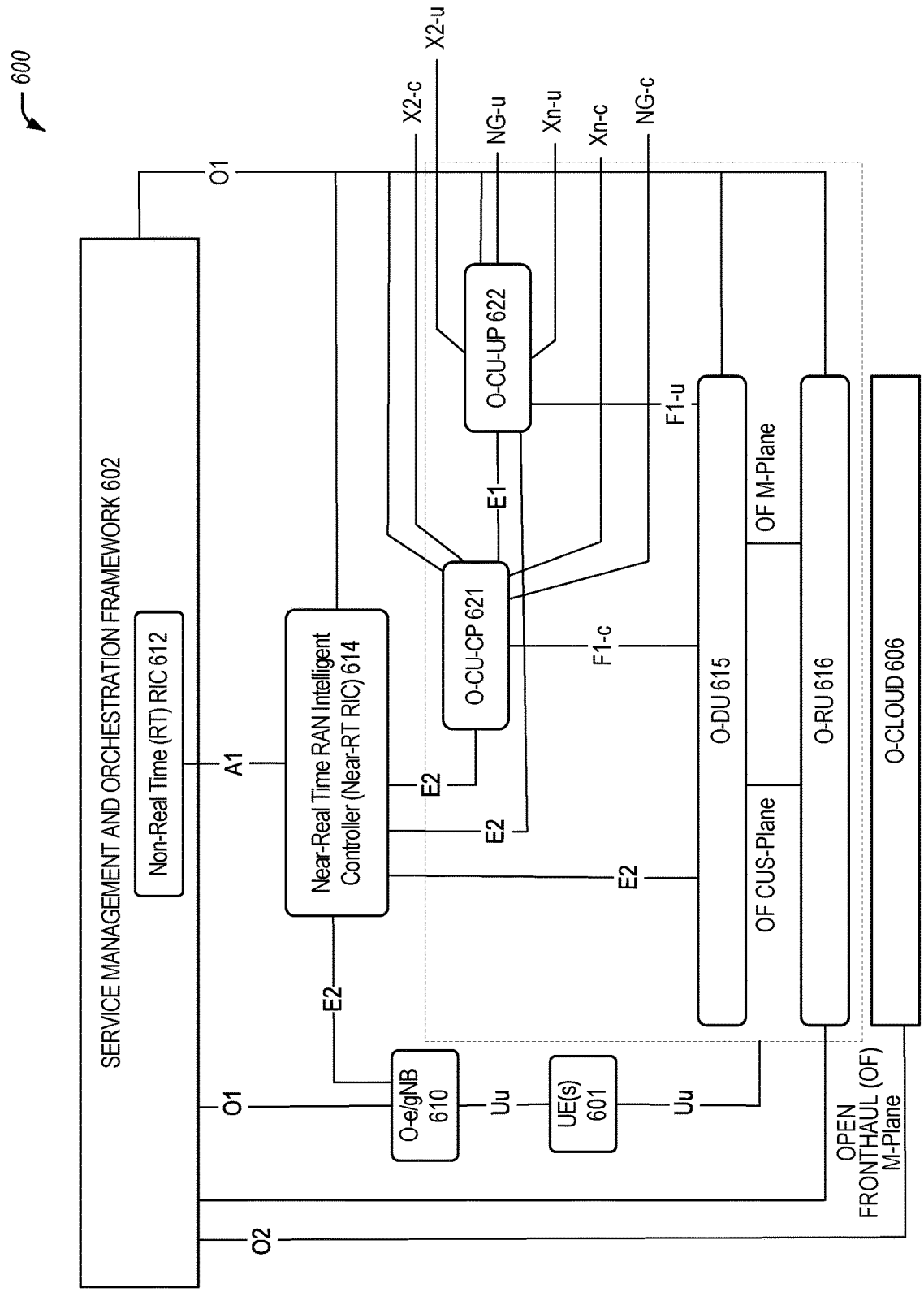
FIG. 6 illustrates a logical architecture of the O-RAN system of FIG. 5, in accordance with some aspects.

FIG. 6 shows an O-RAN logical architecture 600 corresponding to the O-RAN architecture 500 of FIG. 5. In FIG. 6, the SMO 602 corresponds to the SMO 502, O-Cloud 606 corresponds to the O-Cloud 506, the non-RT RIC 612 corresponds to the non-RT RIC 512, the near-RT RIC 614 corresponds to the near-RT RIC 514, and the O-RU 616 corresponds to the O-RU 516 of FIG. 6, respectively. The O-RAN logical architecture 600 includes a radio portion and a management portion.

The management portion/side of the architecture 600 includes the SMO Framework 602 containing the non-RT RIC 612 and may include the O-Cloud 606. The O-Cloud 606 is a cloud computing platform including a collection of physical infrastructure nodes to host the relevant O-RAN functions (e.g., the near-RT RIC 614, O-RAN Central Unit-Control Plane (O-CU-CP) 621, O-RAN Central Unit-User Plane (O-CU-UP) 622, and the O-RAN Distributed Unit (O-DU) 615), supporting software components (e.g., OSs, VMs, container runtime engines, ML engines, etc.), and appropriate management and orchestration functions.

The radio portion/side of the logical architecture 600 includes the near-RT RIC 614, the O-RAN Distributed Unit (O-DU) 615, the O-RU 616, the O-RAN Central Unit-Control Plane (O-CU-CP) 621, and the O-RAN Central Unit-User Plane (O-CU-UP) 622 functions. The radio portion/side of the logical architecture 600 may also include the O-e/gNB 610.

The O-DU 615 is a logical node hosting RLC, MAC, and higher PHY layer entities/elements (High-PHY layers) based on a lower-layer functional split. The O-RU 616 is a logical node hosting lower PHY layer entities/elements (Low-PHY layer) (e.g., FFT/iFFT, PRACH extraction, etc.) and RF processing elements based on a lower layer functional split. Virtualization of O-RU 616 is FFS. The O-CU-CP 621 is a logical node hosting the RRC and the control plane (CP) part of the PDCP protocol. The O O-CU-UP 622 is a logical node hosting the user-plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 621, O-CU-UP 622, O-DU 615, or any combination of elements as defined in [O15]. For E-UTRA access the E2 nodes include the O-e/gNB 610. As shown in FIG. 6, the E2 interface also connects the O-e/gNB 610 to the Near-RT RIC 614. The protocols over the E2 interface are based exclusively on Control Plane (CP) protocols. The E2 functions are grouped into the following categories: (a) near-RT RIC 614 services (REPORT, INSERT, CONTROL, and POLICY, as described in [O15]); and (b) near-RT RIC 614 support functions, which include E2 Interface Management (E2 Setup, E2 Reset, Reporting of General Error Situations, etc.) and Near-RT RIC Service Update (e.g., capability exchange related to the list of E2 Node functions exposed over E2).

FIG. 6 shows the Uu interface between UE 601 and O-e/gNB 610 as well as between the UE 601 and O-RAN components. The Uu interface is a 3GPP-defined interface (see e.g., sections 5.2 and 5.3 of [O07]), which includes a complete protocol stack from L1 to L3 and terminates in the NG-RAN or E-UTRAN. The O-e/gNB 610 is an LTE eNB [O04], a 5G gNB, or ng-eNB that supports the E2 interface. The O-e/gNB 610 may be the same or similar to other RAN nodes discussed previously. The UE 601 may correspond to UEs discussed previously and/or the like. There may be multiple UEs 601 and/or multiple O-e/gNB 610, each of which may be connected to one another via respective Uu interfaces. Although not shown in FIG. 6, the O-e/gNB 610 supports O-DU 615 and O-RU 616 functions with an Open Fronthaul interface between them.

The Open Fronthaul (OF) interface(s) is/are between O-DU 615 and O-RU 616 functions [O17]. The OF interface (s) includes the Control User Synchronization (CUS) Plane and Management (M) Plane. FIG. 5 and FIG. 6 also show that the O-RU 616 terminates the OF M-Plane interface towards the O-DU 615 and optionally towards the SMO 602 as specified in [O16]. The O-RU 616 terminates the OF CUS-Plane interface towards the O-DU 615 and the SMO 602.

The F1-c interface connects the O-CU-CP 621 with the O-DU 615. As defined by 3GPP, the F1-c interface is between the gNB-CU-CP and gNB-DU nodes [O10]. However, for purposes of O-RAN, the F1-c interface is adopted between the O-CU-CP 621 with the O-DU 615 functions while reusing the principles and protocol stack defined by 3GPP and the definition of interoperability profile specifications.

The F1-u interface connects the O-CU-UP 622 with the O-DU 615. As defined by 3GPP, the F1-u interface is between the gNB-CU-UP and gNB-DU nodes [O10]. However, for purposes of O-RAN, the F1-u interface is adopted between the O-CU-UP 622 with the O-DU 615 functions while reusing the principles and protocol stack defined by 3GPP and the definition of interoperability profile specifications.

The NG-c interface is defined by 3GPP as an interface between the gNB-CU-CP and the AMF in the 5GC [O06]. The NG-c is also referred to as the N2 interface (see [O06]). The NG-u interface is defined by 3GPP, as an interface between the gNB-CU-UP and the UPF in the 5GC [O06]. The NG-u interface is referred to as the N3 interface (see [O06]). In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., [O05], [O06]). In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., [O06], [O08]). In O-RAN, Xn-c and Xn-u protocol stacks defined by 3GPP are reused and may be adapted for O-RAN purposes.

The E1 interface is defined by 3GPP as being an interface between the gNB-CU-CP (e.g., gNB-CU-CP 3728) and gNB-CU-UP (see e.g., [O07], [O09]). In O-RAN, E1 protocol stacks defined by 3GPP are reused and adapted as an interface between the O-CU-CP 621 and the O-CU-UP 622 functions.

The O-RAN Non-Real Time (RT) RAN Intelligent Controller (RIC) 612 is a logical function within the SMO framework 502, 602 that enables non-real-time control and optimization of RAN elements and resources; AI/machine learning (ML) workflow(s) including model training, inferences, and updates; and policy-based guidance of applications/features in the Near-RT RIC 614.

In some embodiments, the non-RT RIC 612 is a function that sits within the SMO platform (or SMO framework) 602 in the O-RAN architecture. The primary goal of non-RT RIC is to support intelligent radio resource management for a non-real-time interval (i.e., greater than 500 ms), policy optimization in RAN, and insertion of AI/ML models to near-RT RIC and other RAN functions. The non-RT RIC terminates the A1 interface to the near-RT RIC. It will also collect OAM data over the O1 interface from the O-RAN nodes.

The O-RAN near-RT RIC 614 is a logical function that enables near-real-time control and optimization of RAN elements and resources via fine-grained data collection and actions over the E2 interface. The near-RT RIC 614 may include one or more AI/ML workflows including model training, inferences, and updates.

The non-RT RIC 612 can be an ML training host to host the training of one or more ML models. ML training can be performed offline using data collected from the RIC, O-DU 615, and O-RU 616. For supervised learning, non-RT RIC 612 is part of the SMO 602, and the ML training host and/or ML model host/actor can be part of the non-RT RIC 612 and/or the near-RT RIC 614. For unsupervised learning, the ML training host and ML model host/actor can be part of the non-RT RIC 612 and/or the near-RT RIC 614. For reinforcement learning, the ML training host and ML model host/actor may be co-located as part of the non-RT RIC 612 and/or the near-RT RIC 614. In some implementations, the non-RT RIC 612 may request or trigger ML model training in the training hosts regardless of where the model is deployed and executed. ML models may be trained and not currently deployed.

In some implementations, the non-RT RIC 612 provides a queryable catalog for an ML designer/developer to publish/install trained ML models (e.g., executable software components). In these implementations, the non-RT RIC 612 may provide a discovery mechanism if a particular ML model can be executed in a target ML inference host (MF), and what number and type of ML models can be executed in the MF. For example, there may be three types of ML catalogs made discoverable by the non-RT RIC 612: a design-time catalog (e.g., residing outside the non-RT RIC 612 and hosted by some other ML platform(s)), a training/deployment-time catalog (e.g., residing inside the non-RT RIC 612), and a run-time catalog (e.g., residing inside the non-RT RIC 612). The non-RT RIC 612 supports the necessary capabilities for ML model inference in support of ML-assisted solutions running in the non-RT RIC 612 or some other ML inference host. These capabilities enable executable software to be installed such as VMs, containers, etc. The non-RT RIC 612 may also include and/or operate one or more ML engines, which are packaged software executable libraries that provide methods, routines, data types, etc., used to run ML models. The non-RT RIC 612 may also implement policies to switch and activate ML model instances under different operating conditions.

The non-RT RIC 612 can access feedback data (e.g., FM and PM statistics) over the O1 interface on ML model performance and perform necessary evaluations. If the ML model fails during runtime, an alarm can be generated as feedback to the non-RT RIC 612. How well the ML model is performing in terms of prediction accuracy or other operating statistics it produces can also be sent to the non-RT RIC 612 over O1. The non-RT RIC 612 can also scale ML model instances running in a target MF over the O1 interface by observing resource utilization in MF. The environment where the ML model instance is running (e.g., the MF) monitors the resource utilization of the running ML model. This can be done, for example, by using an ORAN-SC component called ResourceMonitor in the near-RT RIC 614 and/or in the non-RT RIC 612, which continuously monitors resource utilization. If resources are low or fall below a certain threshold, the runtime environment in the near-RT RIC 614 and/or the non-RT RIC 612 provides a scaling mechanism to add more ML instances. The scaling mechanism may include a scaling factor such as a number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 612 (within or outside the SMO 602) and the near-RT RIC 614. The A1 interface supports three types of services as defined in [O14], including a Policy Management Service, an Enrichment Information Service, and an ML Model Management Service. A1 policies have the following characteristics compared to persistent configuration [O14]: A1 policies are not critical to traffic; A1 policies have temporary validity; A1 policies may handle individual UE or dynamically defined groups of UEs; A1 policies act within and take precedence over the configuration; and A1 policies are non-persistent, i.e., do not survive a restart of the near-RT RIC.

The following References are used in the preceding paragraphs: [O04] 3GPP TS 36.401 v15.1.0 (2019-01-09); [O05] 3GPP TS 36.420 v15.2.0 (2020-01-09); [O06] 3GPP TS 38.300 v16.0.0 (2020-01-08); [O07] 3GPP TS 38.401 v16.0.0 (2020-01-09); [O08] 3GPP TS 38.420 v15.2.0 (2019-01-08); [O09] 3GPP TS 38.460 v16.0.0 (2020-01-09); [O10] 3GPP TS 38.470 v16.0.0 (2020-01-09); [O12] O-RAN Alliance Working Group 1, O-RAN Operations and Maintenance Architecture Specification, version 2.0 (December 2019) ("O-RAN-WG1.OAM-Architecture-v02.00"); [O13] O-RAN Alliance Working Group 1, O-RAN Operations and Maintenance Interface Specification, version 2.0 (December 2019) ("O-RAN-WG1.O1-Interface-v02.00"); [O14] O-RAN Alliance Working Group 2, O-RAN A1 interface: General Aspects and Principles Specification, version 1.0 (October 2019) ("ORAN-WG2.A1.GA&P-v01.00"); [O15] O-RAN Alliance Working Group 3, Near-Real-time RAN Intelligent Controller Architecture & E2 General Aspects and Principles ("ORAN-WG3.E2GAP.0-v0.1"); [O16] O-RAN Alliance Working Group 4, O-RAN Fronthaul Management Plane Specification, version 2.0 (July 2019) ("ORAN-WG4.MP.0-v02.00.00"); and [O17] O-RAN Alliance Working Group 4, O-RAN Fronthaul Control, User and Synchronization Plane Specification, version 2.0 (July 2019) ("ORAN-WG4.CUS.0-v02.00").

In some embodiments, an O-RAN network node can include a disaggregated node with at least one O-RAN Radio Unit (O-RU), at least one O-DU coupled via an F1 interface to at least one O-CU coupled via an E2 interface to a RIC (e.g., RIC 612 and/or RIC 614).

As illustrated in FIG. 5 and FIG. 6, key interfaces in O-RAN (e.g., defined and maintained by O-RAN) include the following interfaces: A1, O1, O2, E2, Open Fronthaul M-Plane, and O-Cloud. O-RAN network functions (NFs) can be VNFs, VMs, Containers, and PNFs. Interfaces defined and maintained by 3GPP which are part of the O-RAN architecture include the following interfaces: E1, F1, NG-C, NG-U, X2, Xn, and Uu interfaces.

As illustrated in FIG. 5 and FIG. 6, the following O-RAN control loops may be configured:
 (a) Loop-1: (O-DU Scheduler control loop) TTI msec level scheduling;
 (b) Loop-2: (Near-RT RIC) 10-500 msec resource optimization; and
 (c) Loop-3: (Non-RT RIC) Greater than 500 msec, Policies, Orchestration, and SON.

As illustrated in FIG. 5 and FIG. 6, the following O-RAN nodes may be configured:
 (a) O-CU-CP: RRC and PDCP-C NFs (associated with Loop-2);
 (b) O-CU-UP: SDAP and PDCP-U NFs (associated with Loop-2);
 (c) O-DU: RLC, MAC, and PHY-U NFs (associated with Loop-1); and
 (d) O-RU: PHY-L and RF (associated with Loop 1).

As illustrated in FIG. 5 and FIG. 6, the following O-RAN RIC components may be configured:
 (a) Non-RT-RIC: Loop 3 RRM services (O1 and A1 interfaces); and
 (b) Near-RT-RIC: Loop 2 RRM services (E2 interface).

As illustrated in FIG. 5 and FIG. 6, the following O-RAN interfaces may be configured:
 (a) A1 interface is between Non-RT-RIC and the Near-RT RIC functions; A1 is associated with policy guidance for control-plane and user-plane functions; Impacted O-RAN elements associated with A1 include O-RAN nodes, UE groups, and UEs;
 (b) O1 interface is between O-RAN Managed Element and the management entity; O1 is associated with Management-plane functions, Configuration, and threshold settings mostly OAM & FCAPS functionality to O-RAN network functions; Impacted O-RAN elements associated with O1 include mostly O-RAN nodes and UE groups (identified e.g. by S-NSSAI and slice ID), sometimes individual UEs (pending solution for UE identifiers);
 (c) O2 interface is between the SMO and Infrastructure Management Framework; O2 is associated with the management of Cloud infrastructure and Cloud resources allocated to O-RAN, FCAPS for O-Cloud; Impacted O-RAN elements associated with O2 include O-Cloud, UE groups, and UEs;
 (d) E2 interface is between Near-RT RIC and E2 node; E2 is associated with control-plane and user-plane control functions; Impacted O-RAN elements associated with E2 include mostly individual UEs, sometimes UE groups and E2 nodes;
 (e) E2-cp is between Near-RT RIC and O-CU-CP functions. E2-up is between Near-RT RIC and O-CU-UP functions;
 (f) E2-du is between Near-RT RIC and O-DU functions. E2-en is between Near-RT RIC and O-eNB functions; and
 (g) Open Fronthaul Interface is between O-DU and O-RU functions; this interface is associated with CUS (Control User Synchronization) Plane and Management Plane functions and FCAPS to O-RU; Impacted O-RAN elements associated with the Open Fronthaul Interface include O-DU and O-RU functions.

As illustrated in FIGS. 1-6, the following 3GPP interfaces may be configured:
 (a) E1 interface between the gNB-CU-CP and gNB-CU-UP logical nodes. In O-RAN, it is adopted between the O-CU-CP and the O-CU-UP.
 (b) F1 interface between the gNB-CU and gNB-DU logical nodes. In O-RAN, it is adopted between the O-CU and the O-DU. F1-c is between O-CU-CP and O-DU functions. F1-u is between O-CU-UP and O-DU functions.
 (c) The NG-U interface is between the gNB-CU-UP and the UPF in the 5GC and is also referred to as N3. In O-RAN, it is adopted between the O-CU-UP and the 5GC.
 (d) The X2 interface connects eNBs or connects eNB and en-gNB in EN-DC. In O-RAN, it is adopted for the definition of interoperability profile specifications. X2-c is for the control plane. X2-u for a user plane.
 (e) The Xn interface connects gNBs, and ng-eNBs, or connects ng-eNB and gNB. In O-RAN, it is adopted for the definition of interoperability profile specifications. Xn-c is for the control plane. Xn-u is for the user plane.
 (f) The UE to e/gNB interface is the Uu interface and is a complete protocol stack from L1 to L3 and terminates in the NG-RAN. Since the Uu messages still flow from the UE to the intended e/gNB managed function, it is not shown in the O-RAN architecture as a separate interface to a specific managed function.

In example embodiments, any of the UEs or RAN network nodes discussed in connection with FIG. 1A-FIG. 6 can be configured to operate using the techniques discussed herein associated with multi-access traffic management in an O-RAN architecture.

In some aspects, the disclosed techniques include at least one algorithm and at least one apparatus for beam space compression in a MIMO system with certain architectural constraints. The disclosed techniques relate to UL communications in 5G NR systems with massive MIMO where the current industry trend of moving to the centralized radio access network (RAN) architecture presents unique technical challenges (which are addressed by the disclosed techniques). In Cloud RAN (C-RAN), while the radio and analog/digital front-end hardware of the base station (BS) is deployed close to the user equipment (UE), upper physical layer (PHY) processing can be centralized to a more convenient location. This processing has the benefit of ease of scalability of the network as well as cost saving (e.g., by consolidating multiple cells into one site) and better coordination between cells (e.g., to reduce interference, etc.). The disclosed techniques can be based on an assumption that the BS is an Open RAN (O-RAN) compliant BS architecture. Additionally, Open-radio unit (O-RU) and open-distributed unit (O-DU) nodes (or parts) of the base station can be partitioned (e.g., as illustrated in FIGS. 7-8) according to a pre-configured split (e.g., a 7-2 split) as illustrated in FIG. 9.

Figure 7:
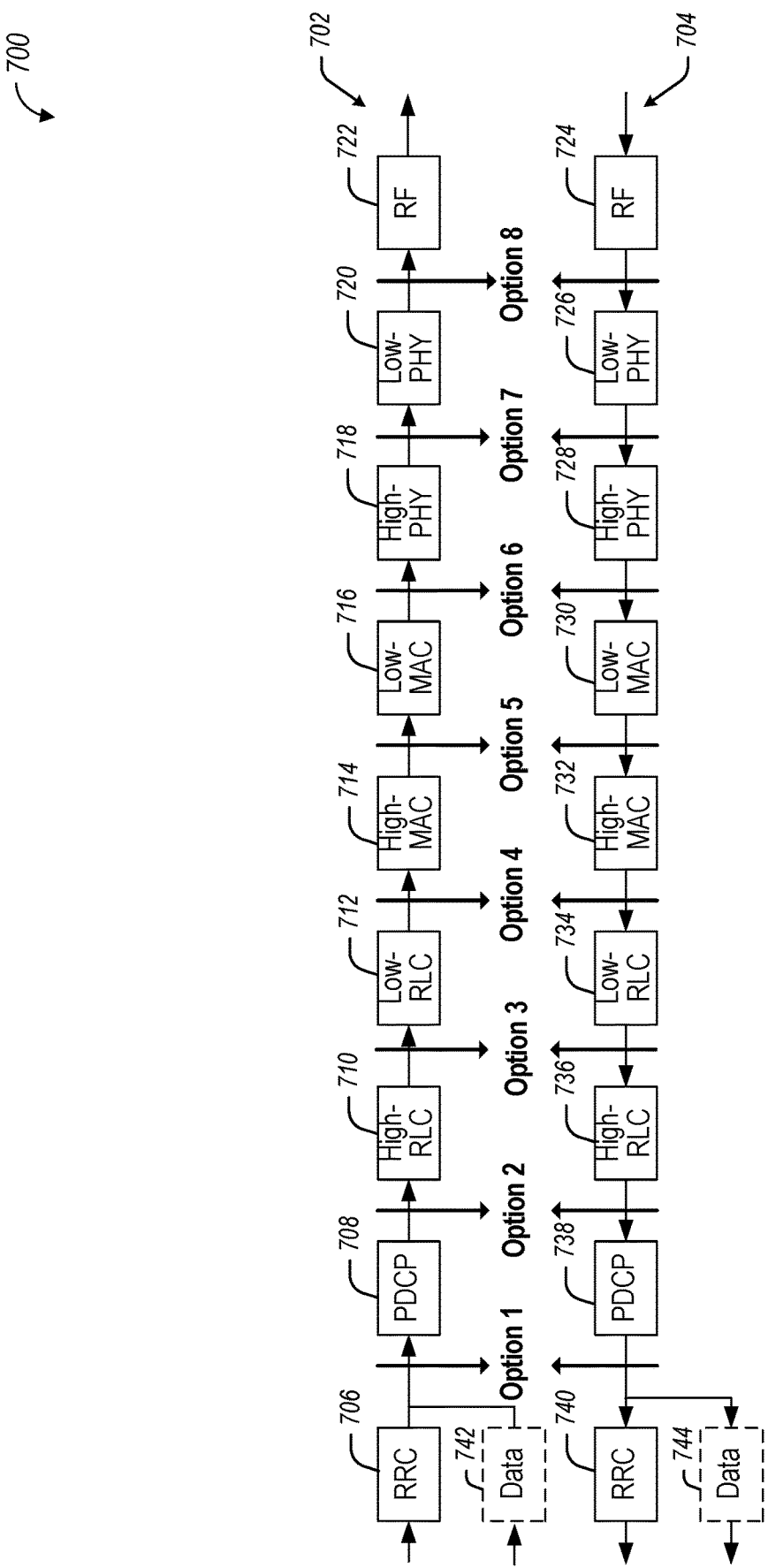
FIG. 7 illustrates a 5G functional split that can be used by the disclosed O-RAN systems, in accordance with some aspects.

FIG. 7 illustrates diagram 700 of a 5G functional split which can be used by the disclosed O-RAN systems, in accordance with some aspects. Referring to FIG. 7, diagram 700 illustrates DL processing chain 702 for processing DL data 742 and UL processing chain 704 for processing UL data 744 in a base station. The DL processing chain includes the following circuitry configured to process DL data 742: radio resource control (RRC) processing circuitry 706, packet data convergence protocol (PDCP) circuitry 708, high radio link control (RLC) circuitry 710, low RLC circuitry 712, high media access control (MAC) circuitry 714, low MAC circuitry 716, high physical layer (PHY) circuitry 718, low PHY circuitry 720, and radio frequency (RF) circuitry 722.

The UL processing chain 704 includes the following circuitry configured to process UL data 744: RF circuitry 724, low PHY circuitry 726, high PHY circuitry 728, low MAC circuitry 730, high MAC circuitry 732, low RLC circuitry 734, high RLC circuitry 736, PDCP circuitry 738, and RRC circuitry 740.

Figure 8:
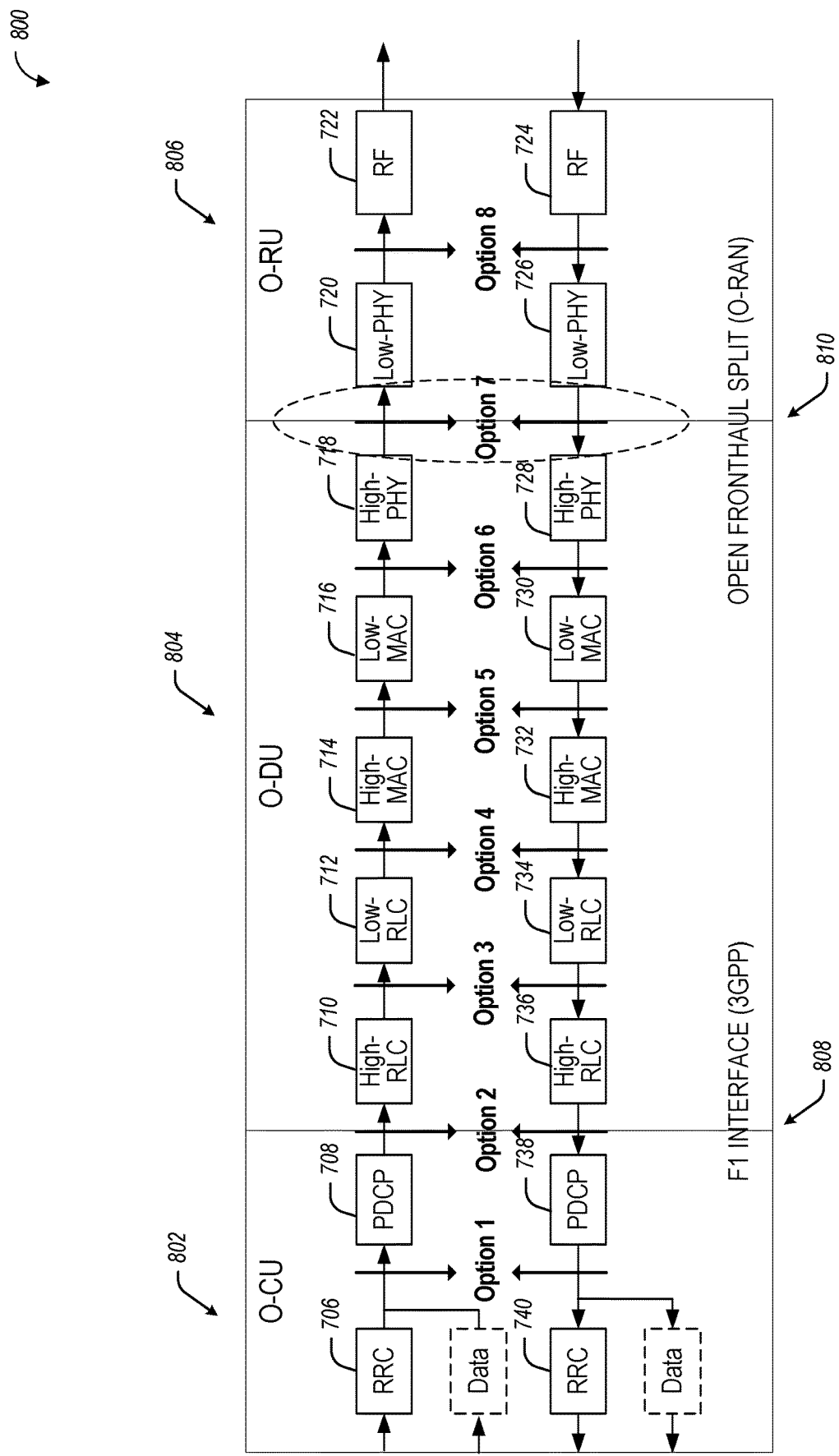
FIG. 8 illustrates another view of the 5G functional split of FIG. 7 with annotated base station nodes performing the corresponding functions, in accordance with some aspects.
Figure 9:
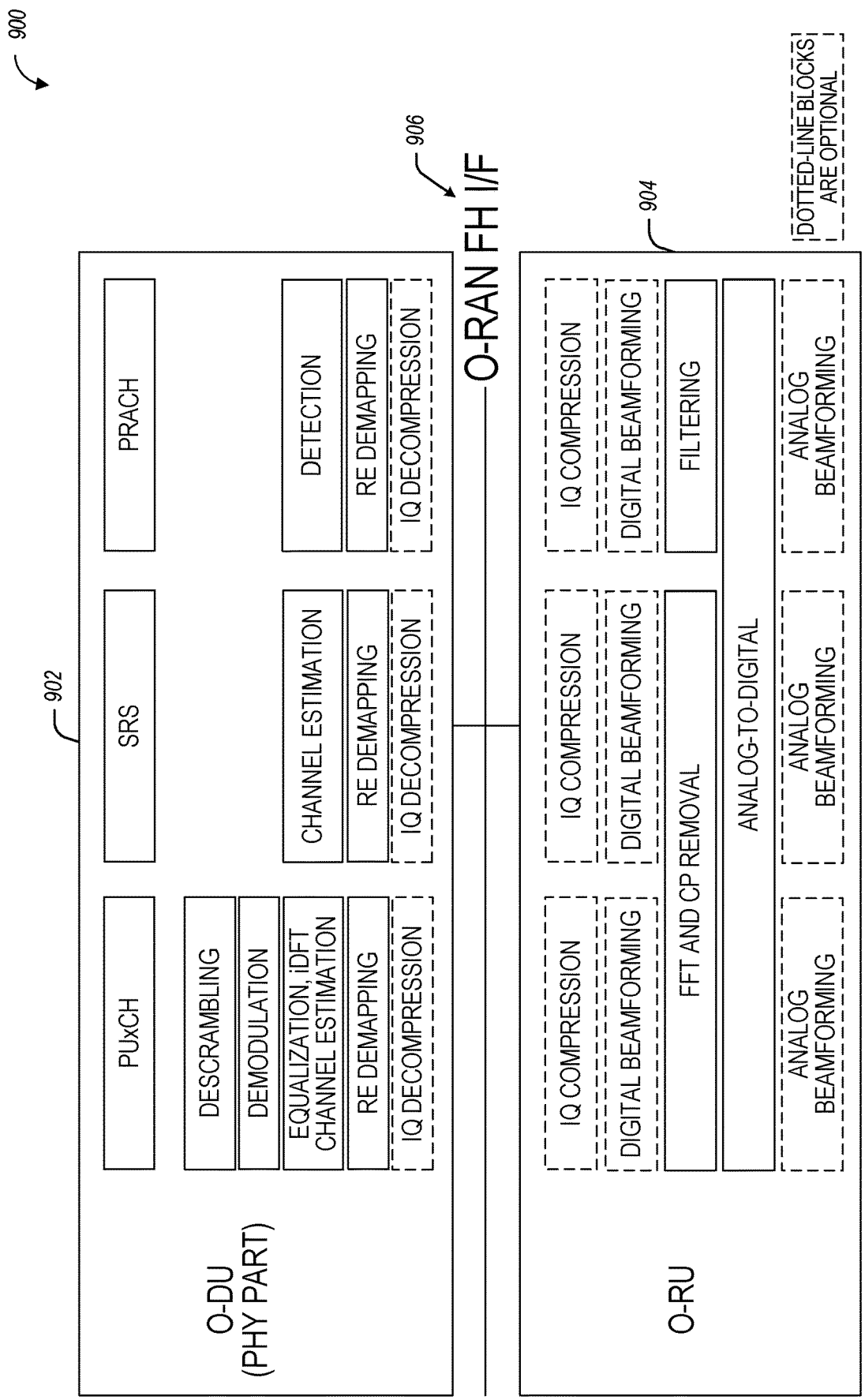
FIG. 9 illustrates an O-RAN UL 7-2 functional split, in accordance with some aspects.

FIG. 8 illustrates another view 800 of the 5G functional split of FIG. 7 with annotated base station nodes performing the corresponding functions, in accordance with some aspects.

As illustrated in FIG. 7 and FIG. 8, the base station can be configured with 8 different functional splits of the 9 functions in each of the UL processing chain 704 and the DL processing chain 702, corresponding to Options 1-8. In other words, Option 1 corresponds to a 1-7 functional split where the RRC circuitry is at one node of the base station (also referred to as part, component, or functional unit) such as O-DU, and the remaining circuitry (e.g., PDCP through RF) are at another node of the base station such as O-RU.

In some aspects, a 7-2 split is illustrated in FIG. 8, where a fronthaul interface 810 at "Option 7" splits the functionalities so that O-DU 804 of the base station performs RRC through high PHY processing, and O-RU 806 of the base station performs low PHY and RF processing. In some embodiments, the O-DU functions can be further split (e.g., by an F1 interface 808) and some of the RRC through high PHY functions can be performed by the O-RAN central unit (O-CU) 802 of the base station.

In some embodiments, 5G functional splits can be beneficial for cost savings for open interfaces between hardware (H/W) and software (S/W) components. In some aspects, the selection of the functional split depends on numerous factors such as deployment morphology, infrastructure availability, focus on providing better network coverage or capacity, etc. In some aspects, to achieve pre-defined key performance indicators (KPIs) of a 5G deployment targeting higher network capacity, e.g., in urban/dense urban areas where network growth opportunities are available, the selection of the fronthaul split (e.g., at the fronthaul interface 810) can be an important configuration.

FIG. 9 illustrates an O-RAN UL 7-2 functional split in a base station 900, in accordance with some aspects. Referring to FIG. 9, the base station 900 includes O-DU 902 and O-RU 904 separated by the O-RAN fronthaul interface 906. More specifically, base station 900 is configured with a 7-2 split, where only low PHY and RF functionalities are performed by the O-RU 904, and the remaining RRC through high PHY functionalities are performed by the O-DU 902.

Traditional telecom equipment manufacturers (TEMs) have pointed out that the O-RAN 7-2 split base station architecture can be associated with approximately 10 dB signal-to-noise ratio (SNR) loss, leading to a loss in spectral efficiency (SE), in high mobility and/or interfere scenarios. Example UL signal processing flow for O-RAN 7-2 split architecture is illustrated in FIG. 10.

Figure 10:
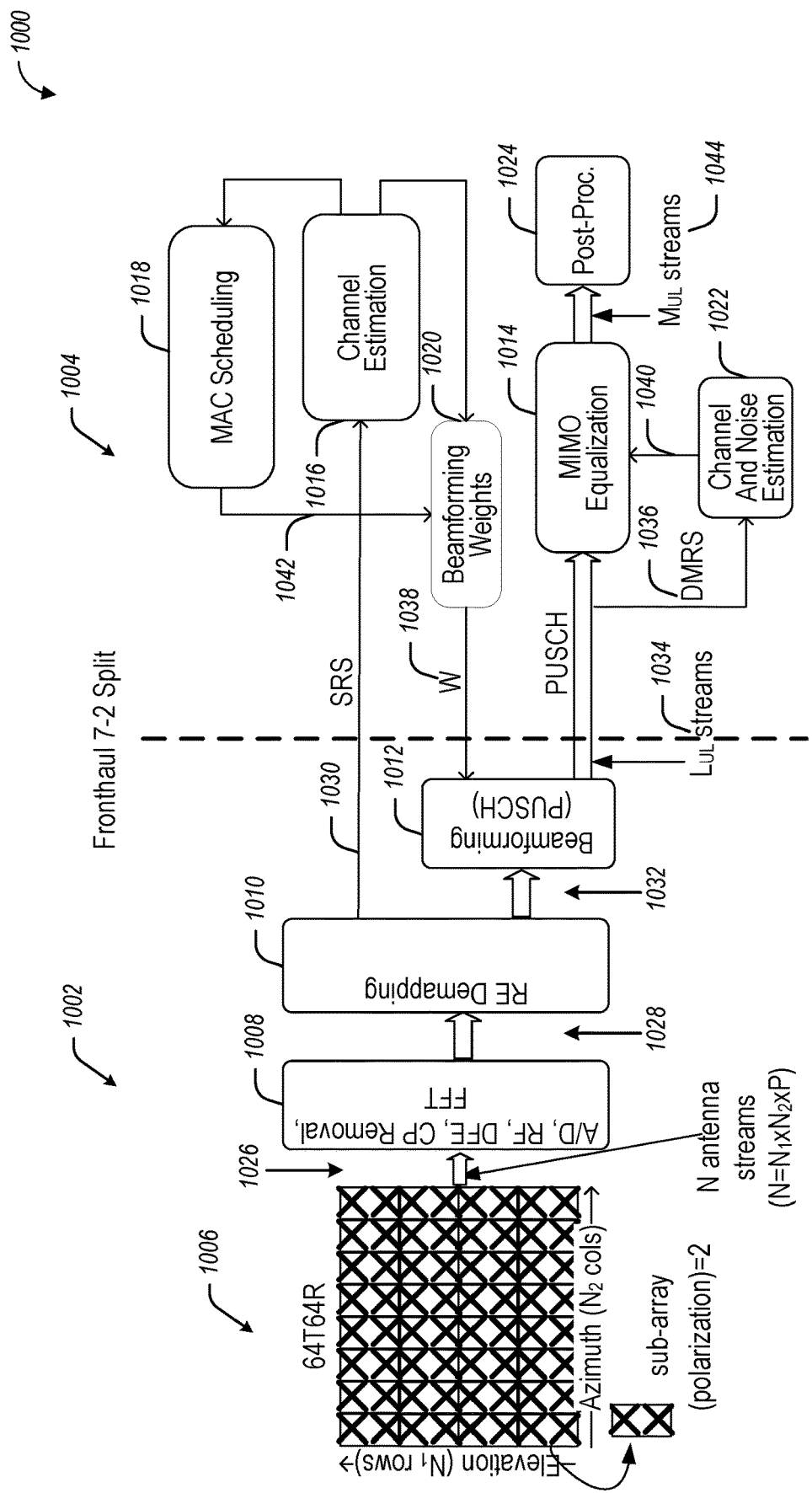
FIG. 10 illustrates UL processing for O-RAN 7-2 split architecture, in accordance with some aspects.

FIG. 10 illustrates UL processing for O-RAN 7-2 split base station architecture 1000, in accordance with some aspects. The 7-2 split of base station architecture 1000 includes a functional split between O-RU 1002 and O-DU 1004.

The O-RU 1002 includes a plurality of antennas 1006, front-end processing circuitry 1008, resource element (RE) demapping circuitry 1010, and beamforming circuitry 1012.

The O-DU 1004 includes MAC scheduling circuitry 1018, channel estimation circuitry 1016, beamforming weights generation circuitry 1020, MIMO equalization circuitry 1014, channel and noise estimation circuitry 1022, and post-processing circuitry 1024.

In operation, the plurality of antennas 1006 receive a UL stream which is communicated as multiple time domain signals 1026 to the front-end processing circuitry 1008. The front-end processing circuitry 1008 performs an analog-to-digital conversion, decision feedback equalization (DFE), cyclic prefix (CP) removal, and fast Fourier transformation (FFT) to generate multiple orthogonal frequency division multiplexing (OFDM) symbols 1028 (e.g., one OFDM symbol per antenna). The multiple OFDM symbols 1028 are processed by RE demapping circuitry 1010 to generate reference signals 1030 (e.g., sounding reference signals or SRS) and UL data signals (or signal vectors) 1032. The UL data signals 1032 are communicated to the beamforming circuitry 1012, where beamforming weights 1038 are applied to generate UL data streams 1034 (e.g., physical uplink shared channel or PUSCH streams).

In some embodiments, the channel estimation circuitry 1016 generates channel and noise covariance information based on the reference signals 1030, which information is communicated to the MAC scheduling circuitry 1018 and the beamforming weights generation circuitry 1020. The MAC scheduling circuitry 1018 receives the channel and noise covariance information from the channel estimation circuitry 1016 to generate UE pairing information 1042. The beamforming weights generation circuitry 1020 uses the UE pairing information 1042 and the channel and noise covariance information to generate beamforming weights 1038.

The UL data streams 1034 are communicated to the MIMO equalization circuitry 1014. The channel and noise estimation circuitry 1022 receives demodulation reference signals (DMRS) 1036 from the UL data streams 1034 and generates channel and noise estimates 1040. The MIMO equalization circuitry 1014 performs equalization of the UL data streams 1034 using the channel and noise estimates 1040 to generate MIMO layers 1044. The MIMO layers 1044 are post-processed by the post-processing circuitry 1024.

In some embodiments, the beamforming circuitry 1012 in O-RU 1002 applies the beamforming weights 1038 provided by the O-DU 1004 to compress the N number of antenna streams into L output streams. This processing can be performed to reduce the fronthaul data rate as well as to lower the complexity demand on the O-DU by sending a lower dimension for MIMO processing. The beamforming weights 1038 (also referenced as W) can be calculated in the O-DU using SRS-based channel estimations (CE). The L_UL data streams (e.g., UL data streams 1034) arriving at the O-DU are multi-user MIMO (MU-MIMO) combined using minimum mean squared error-interference rejection combining (MMSE-IRC) or minimum mean squared error-maximal rejection combining (MMSE-MRC) algorithm where channel estimation based on demodulator reference symbol (DMRS) is used.

In some aspects, SRS periodicity can be kept high (e.g., in the order of 5 ms) compared to UL slot periodicity (e.g., 0.5 ms) to reduce pilot overhead whereas DMRS occurs in every slot. Therefore, SRS-based channel estimates can be less accurate (in tracking time variations, etc.) compared to DMRS-based channel estimation. In this regard, beam compression based on SRS CE-based weights can lead to loss of information in the O-RU during the compression process. This loss can lead to SNR loss in this split architecture MIMO combining with reference to an integrated architecture where DMRS channel estimation is available for MIMO combining in each slot. The loss of approximately 10 dB mentioned above, in high mobility and interference-limited UEs, is related to this type of processing.

The disclosed techniques provide methods for beam compression based on SRS channel estimations, that are more robust against the mobility of the UEs and interference from UEs from other cells. For example, robustness against mobility can be achieved by SRS-based channel prediction or by using beam aggregation. Interference mitigation can be achieved using uncompressed DMRS-based interference estimation in the O-DU. In this regard, the disclosed techniques include combining of SRS prediction and DMRS-based noise pre-whitening as a solution to the above-mentioned drawbacks of only using SRS-based weight estimation. The disclosed techniques also use a combination of beam aggregation and DMRS-based noise pre-whitening.

In some aspects, massive MIMO reception with O-RAN 7-2 split may use beam compression in the O-RU to reduce the amount of fronthaul data that needs to be sent from the O-RU to the O-DU. Beam compression can be performed using SRS-based dynamic beam forming in the UL. In category B architecture, the O-DU estimates the SRS channel for all antenna ports and calculates the beamforming (BF) weights. The BF weights are passed to the O-RU to be applied to the UL data symbols (e.g., in the PUSCH). Since the SRS is only sent at a certain period (e.g., every 5 ms), SRS-based beamforming can lead to a loss in performance due to channel aging. Furthermore, some loss in performance can also occur due to dimensionality reduction in the O-RU (e.g., beam compression) without the knowledge of interference. With SRS-based beamforming, without the use of DMRS-based noise information, an average and cell edge UE throughput loss can reach approximately 10% per cell scenario.

Techniques described herein address the drawbacks of baseline algorithms. The disclosed techniques combine two configurations to solve the channel aging problem and the interference issue mentioned above. In some aspects, SRS-based prediction can be used to predict the channel based on past SRS instances and then apply conventional BF techniques without the mobility-induced channel aging impact. Alternatively, channel aging can be mitigated with SRS-based beam aggregation (i.e., additional beams to cover UE mobility, such as when the number of beams is larger than the number of layers in the UE multiplex). In reference to interference mitigation, DMRS symbols in the antenna port domain can be passed on to the O-DU from the O-RU using O-RAN non-delay managed (NDM) traffic and can be used to estimate the interference statistics (e.g., covariance) in the antenna dimension. Combined with SRS prediction, an optimal beamformer in the form of noise whitened matched filter, which is theoretically optimal, can be formed. Where channel prediction is not feasible, due to a larger than required SRS period for prediction, beam aggregation techniques can be combined with noise whitening to create the beamforming weights.

In some aspects, with the predicted SRS channel, beam compression can achieve maximum theoretical compression (the number of streams equal to the number of layers). Hence the fronthaul throughput can be minimized by reducing the capacity required from fronthaul connectivity. With DMRS-based noise covariance, the disclosed techniques can be used to mitigate the impact of intercell interference by whitening the spatial noise whereas the current SRS-based beamforming methods rely on spatial filtering of intercell interference using filter weights calculated based on SRS channel estimation. Current SRS-based methods can be ineffective because the spatial filter cannot effectively handle interferers that align spatially with the UEs of interest.

As mentioned above, with SRS-based beamforming, without the use of DMRS-based noise information, an average UE throughput loss of approximately 10% can be experienced for an average 10 full buffer UE per cell scenario. With the noise mitigation techniques described herein, combined with beam aggregation, the throughput loss can be reduced to approximately 5%. Further gains are possible when the noise pre-whitening gets combined with SRS prediction.

In some aspects and in relation to interference mitigation, DMRS symbols in the antenna port domain can be passed on to the O-DU from the O-RU using O-RAN non-delay-managed (NDM) traffic and can be used to estimate the interference statistics (e.g., spatial noise covariance matrix) in the antenna dimension. For the two beamforming approaches mentioned above, interference can be handled using the DMRS-based noise covariance.

Figure 11:
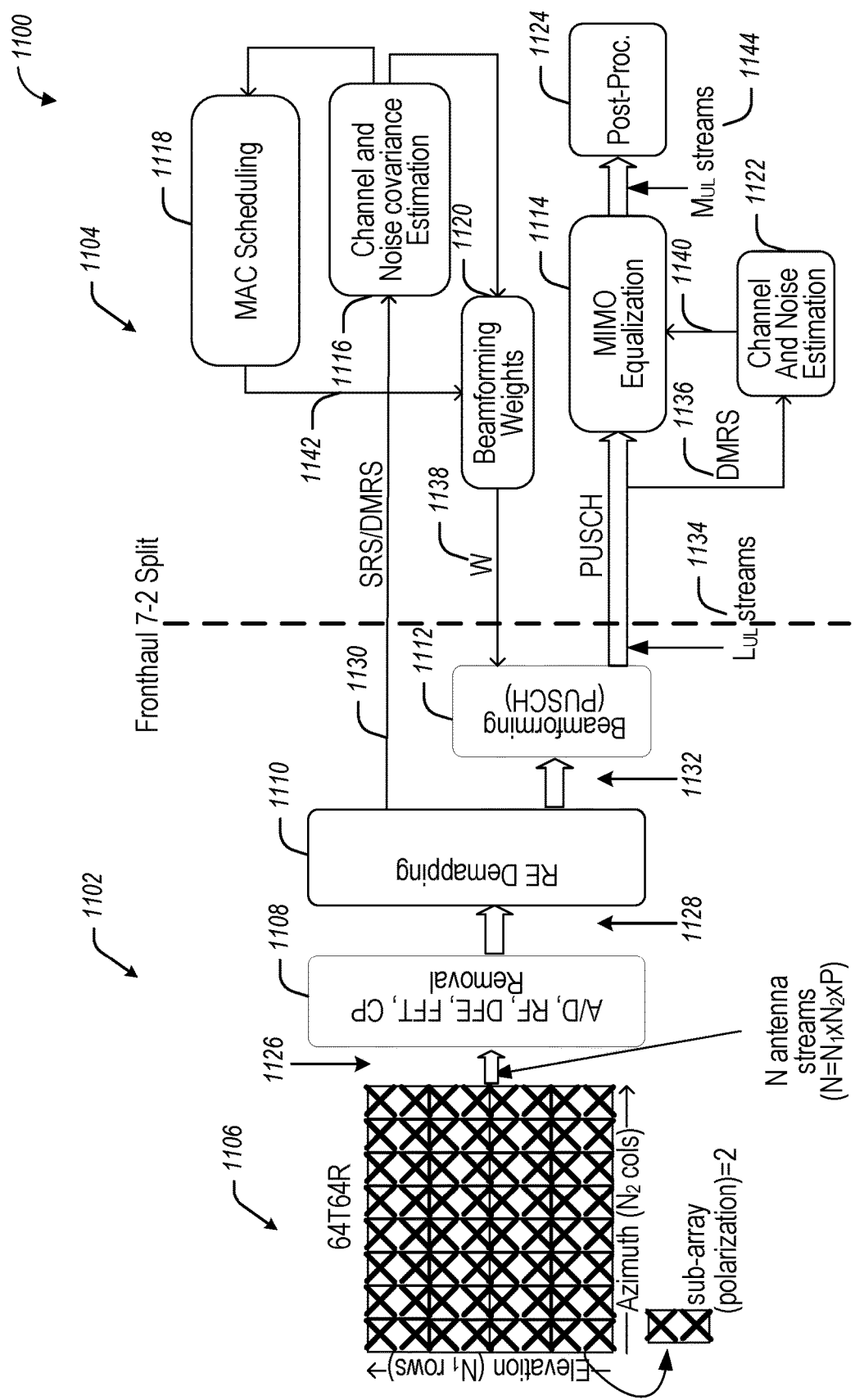
FIG. 11 illustrates UL processing for O-RAN 7-2 split architecture using the disclosed techniques, in accordance with some aspects.

In some aspects (e.g., as illustrated in FIG. 11), combined with SRS prediction, an optimal beamformer in the form of noise whitened matched filter, which is theoretically optimal, can be formed. Interference is mitigated by applying MMSE-IRC in the O-DU using the DMRS-based channel estimate and noise covariance estimates, where both these estimates are done in beam compressed data domain. The O-DU processing of the PUSCH is the same as for current solutions.

In some embodiments associated with beam aggregation, noise whitening based on DMRS-based noise covariance can be used to mitigate interference. Such processing can improve the interference mitigation when MMSE-IRC is applied at the O-DU based on a DMRS-based channel estimate. O-DU processing of PUSCH can be the same as described in connection with FIG. 10. With the disclosed techniques associated with FIG. 11, both SRS and DMRS are captured in the antenna port domain. If there are 64 antennas, for each SRS and DMRS pilot location, a 64×1 size complex vector is captured.

FIG. 11 illustrates UL processing for O-RAN 7-2 split base station architecture 1100 using the disclosed techniques, in accordance with some aspects. The 7-2 split of base station architecture 1100 includes a functional split between O-RU 1102 and O-DU 1104.

The O-RU 1102 includes a plurality of antennas 1106, front-end processing circuitry 1108, RE demapping circuitry 1110, and beamforming circuitry 1112.

The O-DU 1104 includes MAC scheduling circuitry 1118, channel and noise covariance estimation circuitry 1116, beamforming weights generation circuitry 1120, MIMO equalization circuitry 1114, channel and noise estimation circuitry 1122, and post-processing circuitry 1124.

In operation, the plurality of antennas 1106 receive a UL stream which is communicated as multiple time domain signals 1126 to the front-end processing circuitry 1108. The front-end processing circuitry 1108 performs an analog-to-digital conversion, DFE, CP removal, and FFT to generate multiple OFDM symbols 1128 (e.g., one OFDM symbol per antenna). The multiple OFDM symbols 1128 are processed by the RE demapping circuitry 1110 to generate reference signals 1130 (e.g., SRS and DMRS) and UL data signals (or signal vectors) 1132. The UL data signals 1132 are communicated to the beamforming circuitry 1112, where beamforming weights 1138 are applied to generate UL data streams 1134 (e.g., PUSCH streams).

In some embodiments, the channel and noise covariance estimation circuitry 1116 generates channel and noise covariance information based on the SRS and DMRS reference signals 1130, which information is communicated to the MAC scheduling circuitry 1118 and the beamforming weights generation circuitry 1120. The MAC scheduling circuitry 1118 receives the channel and noise covariance information from the channel and noise covariance estimation circuitry 1116 to generate UE pairing information 1142. The beamforming weights generation circuitry 1120 uses the UE pairing information 1142 and the channel and noise covariance information to generate beamforming weights 1138.

The UL data streams 1134 are communicated to the MIMO equalization circuitry 1114. The channel and noise estimation circuitry 1122 receives DMRS 1136 from the UL data streams 1134 and generates channel and noise estimates 1140. The MIMO equalization circuitry 1114 performs equalization of the UL data streams 1134 using the channel and noise estimates 1140 to generate MIMO layers 1144. The MIMO layers 1144 are post-processed by the post-processing circuitry 1124.

In some embodiments, and in reference to FIG. 11, DMRS is also captured in the beam compressed $L_{UL}$ data streams domain for supporting DMRS-based MIMO equalization (e.g., using MMSE-IRC) in the O-DU 1104.

In some embodiments, for time division duplex (TDD) mode, SRS signaling-based UL channel estimation is available in the base station architecture 1100 and SRS channel estimates $H_{SRS}$ (k, l, r, m) for active UEs are stored in memory. The following notations can be used by the disclosed techniques: k is subcarrier index; l is symbol index; r is receive (Rx) antenna index; m is transmission port number; $N_u$ is the number of antenna ports for user u; $M_u$ is the number of layers allocated to user u; and N is the number of RX antenna ports at the base station.

In matrix form, the SRS MIMO channel estimate for user u for subcarrier k at symbol l is given by the following equation:

$$H_{SRS,u}(k, l) = \begin{bmatrix} H_{SRS}(k, l, 0, 0) & \dots & H_{SRS}(k, l, 0, N_u - 1) \\ \vdots & \ddots & \\ H_{SRS}(k, l, N-1, 0) & & H_{SRS}(k, l, N-1, N_u - 1) \end{bmatrix} \quad (1)$$

Denote DMRS-based noise and interference vector estimation is given by the following equation:

$$n_{DMRS}(k, l) = \begin{bmatrix} n_{DMRS}(k, l, 0) \\ n_{DMRS}(k, l, N-1) \end{bmatrix}, \quad (2)$$

where $n_{DMRS}(k,l,r)$ is the noise at subcarrier k for symbol l for RX antenna r (antenna port domain).

In some embodiments, noise covariance can be estimated, first by averaging over frequency (e.g., subcarrier indices) and then over time to get an average sense of interference impacting the cell. In some embodiments, averaging length in time and frequency can be optimized based on any prior knowledge of overall network traffic, including adjacent cells. For example, in a busy network with many users using the network in a burst manner, the amount of time averaging can be limited. The noise covariance estimate can be determined using the following equation:

$$C_{DMRS}(k_i, s) = \frac{1}{K*L} \sum_{k,l} n_{DMRS}(k, s-l) n_{DMRS}^H(k, s-l), \quad (3)$$

where averaging can be performed over neighboring K DMRS pilots to DMRS sub-carrier index $k_i$, and past L DMRS captures, with respect to current slot s.

In some embodiments, the frequency granularity of the noise covariance estimate can be considered another parameter for optimization. In some aspects, such parameters can vary to cover from a small resource block group (RBG) to the entire channel bandwidth.

In some aspects, structured covariance estimation techniques can be used to improve the quality of noise covariance calculated above.

SRS Prediction-Based Beamforming

In some embodiments associated with SRS prediction-based beamforming, SRS prediction for multiple UEs can be based on past SRS channel estimates, to obtain up-to-date and filtered-out estimates of the uplink channel.

For user u at resource block k, at time slot s, denote the predicted channel matrix as $H_{SRS,u}(k,s)$. In some embodiments, $H_{SRS,u}(k,s)$ could be predicted using finite history of $H_{SRS,u}(k,l)$ given in equation (1), not necessarily limiting to sub-carrier index k data, (it could be the SRS channel for entire channel bandwidth used in prediction algorithm—i.e. all available SRS channel estimation data for the given user).

In some aspects, for multiple resource block groups (RBGs), DMRS-based noise and interference covariance estimates can be maintained (e.g., in the antenna port dimension). Depending on the noise covariance estimation frequency granularity, appropriate $C_{DMRS}(k_i)$ can be mapped to noise covariance, C(k,s), to be used for $k^{th}$ RBG beamforming weight calculation. For example, the following equation may be used:

$$C(k, s) \overset{=}{\underset{\min (|k - k_i|)}{}} \{C_{DMRS}(k_i, s)\}, \quad (4)$$

where, for RBG k, the noise and interference matrix to be used is C(k,s).

The above predicted SRS channel estimate $H_{SRS,u}(k,s)$ and DMRS estimated noise covariance C(k,s) can be used to calculate the optimal noise pre-whitened beamforming weights. It can be assumed that the UE multiplex is $\{u_0 u_1, \ldots, u_{K-1}\}$. Beamforming weights can be given by first calculating the matched filter weights using the following equation:

$$W(k,s) = [H_{SRS,u_0}(k,s) H_{SRS,u_{K-1}}(k,s)]^H \quad (5)$$

Processing can proceed to apply the noise pre-whitening to obtain the modified final beamforming weights as provided by the following equation:

$$W_{mod}(k,s) = W(k,s)C(k,s)^{-1} \quad (6)$$

The beamforming matrix when applied to antenna streams in the O-RU leads to the number of streams being equal to the number of layers as output by the beamformer. Beamforming is applied to the MIMO signal in the O-RU based on the following equation:

$$z = W_{mod}(k,s)y = W(k,s)C(k,s)^{-1}y, \quad (7)$$

where y (of size N×1) and z (of size $L_{UL}$×1) are the respective input and output of the beamforming circuitry 1112.

In some embodiments, the disclosed techniques can be used with other beamforming methods. In some embodiments, the above noise pre-whitening solution based on antenna port domain DMRS-based noise covariance estimation can be extended to other beamforming methods, such as Eigen beamforming based on SRS-based channel covariance, discrete Fourier transform grid-of-beams (DFT GoB)-based beamformer. In some aspects, a matched filter beamformer can be used as processing can be optimal when the SRS channel estimate is predicted to the current time (i.e., no channel aging effect). The noise pre-whitened beamforming method described above can be extended to any other beamforming algorithm with the following two-step process:

(a) Step 1: Calculate the beamforming weights W(k,s), with the selected beamforming algorithm. In the case of SRS-based solutions, SRS channel covariance can be used to calculate Eigen beam weights, with more than the number of layers of beams created to mitigate channel aging effects due to UE mobility.

(b) Step 2: Apply noise pre-whitening as given in equation (6).

In some embodiments, the following simulation results can be obtained using the disclosed techniques. The beamforming techniques disclosed herein can be implemented with the SRS channel estimation-based Eigen beamforming with system level simulation (SLS) of UMa 500 m network with an average 10 UE/cell with 21 cell network. Additional Eigen beams can be created to mitigate the SRS channel aging effect—16 streams of FH for up to 8 maximum uplink data layers. Without the DMRS-based noise whitening, a 10% spectral efficiency loss can be detected for an O-RAN 7-2 base station architecture compared to optimal achievable performance (with no fronthaul split). With the DMRS-based noise whitening applied to the beamforming weights, the losses can be lowered to approximately 5%.

The disclosed techniques further include PDSCH beamforming weight generation based on grid-of-beams (GoB) formed using a DFT codeword, which is described in greater detail below.

Figure 12:
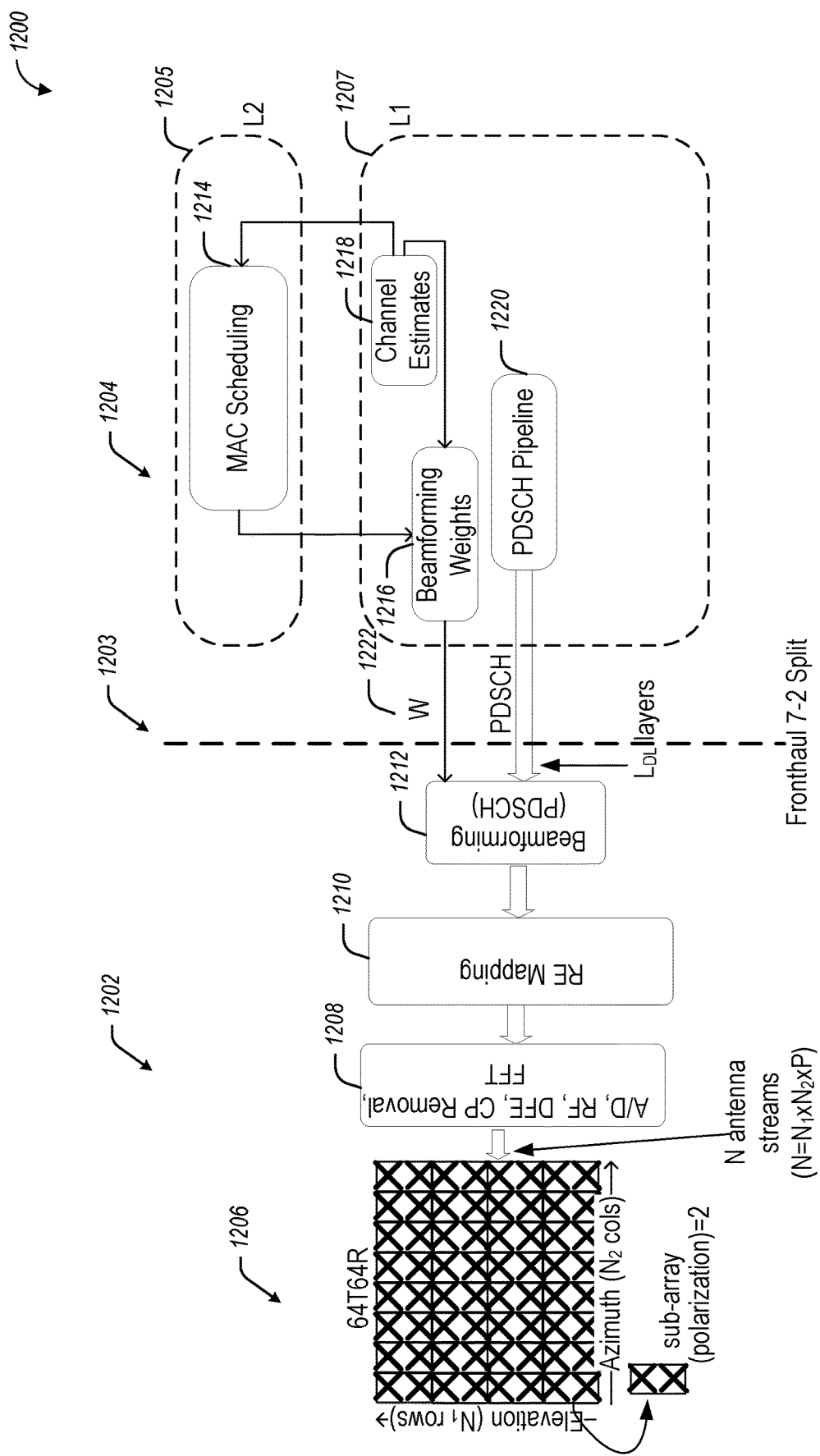
FIG. 12 illustrates DL processing for O-RAN 7-2 split architecture using the disclosed techniques, in accordance with some aspects.

For downlink PDSCH beamforming, top-level signal processing architecture indicating different functions performed by modules in radio unit (RU) and distributed unit (DU) split architecture are illustrated in FIG. 12.

FIG. 12 illustrates DL processing for O-RAN 7-2 split base station architecture 1200 using the disclosed techniques, in accordance with some aspects. Referring to FIG. 12, the 7-2 split of base station architecture 1200 includes a functional split between O-RU 1202 and O-DU 1204 by the fronthaul interface 1203. In some embodiments, the O-RU 1202 and O-DU 1204 can include circuitry that is similar to the circuitry included in O-RU 1102 and O-DU 1104 of FIG. 11, respectively, except that FIG. 12 relates to DL stream processing.

The O-RU 1202 includes a plurality of antennas 1206, front-end processing circuitry 1208, RE mapping circuitry 1210, and beamforming circuitry 1212.

The O-DU 1204 includes Layer 1 (L1) processing circuitry 1207 and Layer 2 (L2) processing circuitry 1205. For example, the L2 processing circuitry 1205 includes MAC scheduling circuitry 1214. The L1 processing circuitry 1207 includes channel estimation circuitry 1218, beamforming weights generation circuitry 1216 (e.g., generating beamforming weights 1222, which are also referred to as weight matrix W or beamforming weight vector W), and a PDSCH processing pipeline 1220.

In some embodiments, a DL compression module (e.g., beamforming circuitry 1212) applies beam compression (BC) weight matrix W to produce the L_DL number of streams for PDSCH.

In some embodiments, the downlink massive MIMO (mMIMO) beamforming weight vector W 1222 is calculated in the O-DU 1204 using the channel estimated from SRS. As a result, SRS symbols are passed through the fronthaul interface 1203 without beamforming compression, while symbols other than the SRS are passed through the fronthaul interface 1203 in compressed L streams form.

In reference to FIG. 12, the DL beamforming weights calculation is depicted as part of the L1 processing circuitry 1207, but in other embodiments, it can be part of the L2 processing circuitry 1205 (in which case, beamforming weights or the beam indices can be passed from the L1 processing circuitry 1207 to the L2 processing circuitry 1205.

In some aspects, for mMIMO configurations, the number of antenna streams N (communicated to antennas 1206) can be 32, 64, etc. Generally, antennas 1206 can include dual-polarized antenna elements organized in 2-D structures. It can be assumed the total number of antenna streams is $N = N_H \times N_V \times 2_{pol} \times 1_{array}$, where $N_H$, $N_V$, and $2_{pol}$ refers to vertical dimensions, horizontal dimension, 2 polarizations of an antenna array and $1_{array}$ stands for 1 antenna array. To identify the elements of an antenna array, the antenna elements are ordered by assigning SRS port numbers as illustrated in FIG. 13 and FIG. 14.

Figure 13:
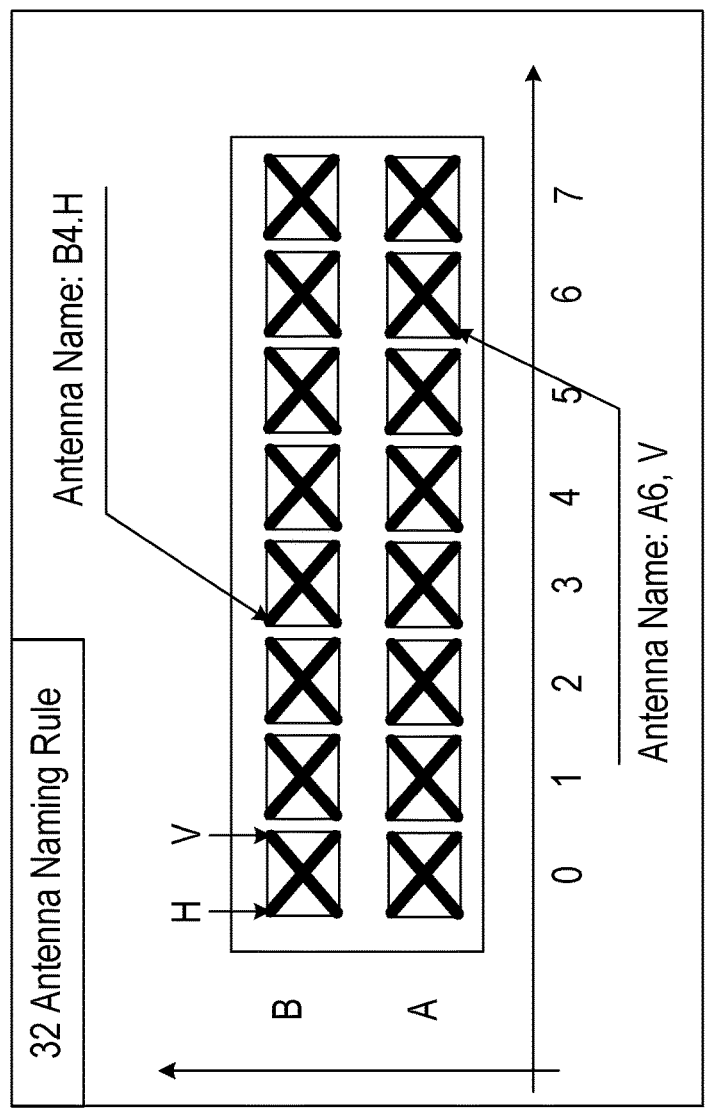

FIG. 13 and FIG. 14 illustrate respective diagrams 1300 and 1400 of antenna element ordering, in accordance with some aspects. Referring to FIGS. 13-14, antenna elements can be ordered firstly by row (bottom to top), secondly by column (left to right), thirdly by polarization, and fourthly by array layer.

In some embodiments, the number of layers multiplexed in an RB is denoted as M, which is also the number of streams post-MIMO combining in the O-DU.

DFT-Based Beamforming Codebook

In some aspects, a low correlation between xPOL and hence the low correlation between the beams from the two antenna arrays is assumed. The horizontal and vertical antenna spacing is defined as $d_H$, and $d_v$, where $d_H \geq \lambda/2$.

Figure 15:
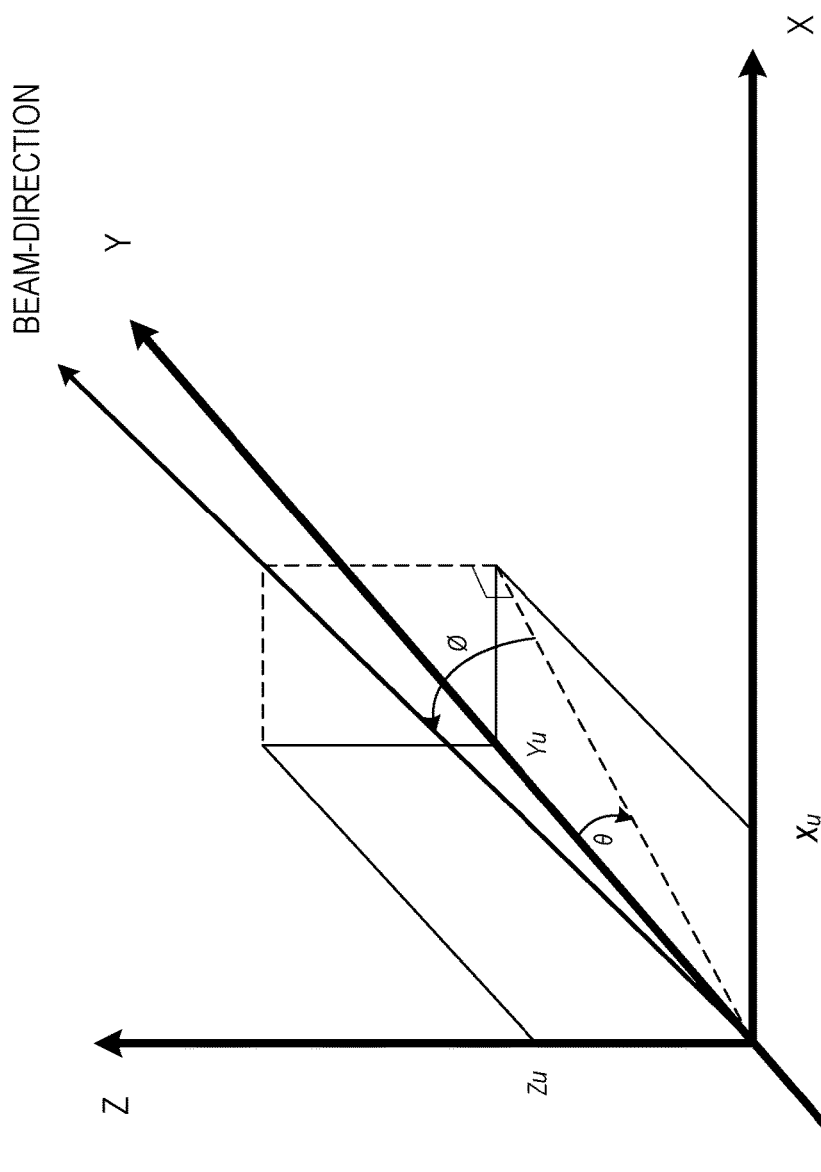
FIG. 15 illustrates beam direction in azimuth and elevation, in accordance with some aspects.

FIG. 15 illustrates a diagram 1500 of beam direction in azimuth and elevation, in accordance with some aspects. More specifically FIG. 15 illustrates the beam direction in azimuth (Az) angle θ, and elevation (El) angle ∅. In FIG. 15, the Y axis is the boresight of the antenna array, and the X and Z axes are horizontal and vertical dimensions of the antenna array.

With the above definition, in the case of non-oversampled DFT beams, Az and El angle sets for the DFT beam grid can be calculated as follows. For ∅=0 beams, phase delta between adjacent horizontal antennas for DFT beams is given by the following equation:

$$-\pi + \frac{2\pi}{N_H} \text{ for } m = 0: N_H - 1.$$

The corresponding Az angle set for orthogonal SDT beams given by the following equation:

$$\theta(m) = \sin^{-1}\left(\left(-\frac{1}{2} + \frac{m}{N_H}\right)\frac{\lambda}{d_H}\right) \text{ for } m = 0: N_H - 1.$$

For θ=0, the El angle set is calculated for the orthogonal DFT beam set based on the following equation:

$$\phi(m) = \sin^{-1}\left(\left(-\frac{1}{2} + \frac{m}{N_V}\right)\frac{\lambda}{d_V}\right) \text{ for } m = 0: N_V - 1.$$

The unambiguous azimuth angle range covered by orthogonal DFT beams is from $$-\sin^{-1}\left(\frac{\lambda}{2d_H}\right) \text{ to } \sin^{-1}\left(\left(\frac{1}{2} - \frac{1}{N_H}\right)\frac{\lambda}{2d_H}\right).$$

Similarly, unambiguous elevation range covered by orthogonal DFT beams is from $$-\sin^{-1}\left(\frac{\lambda}{2d_V}\right) \text{ to } \sin^{-1}\left(\left(\frac{1}{2} - \frac{1}{N_V}\right)\frac{\lambda}{2d_V}\right).$$

A DFT beam codebook C for a polarization has $N_H \times N_V$ codewords. Each codeword of dimension $(N_H \times N_V) \times 1$ is indexed by a tuple (m, n) and can be expressed as kron(v(n), v(m)), where $$v(m) = \begin{bmatrix} 1 \\ e^{-\frac{j2\pi m}{N_H}} \\ \vdots \\ e^{-\frac{j2\pi m(N_H-1)}{N_H}} \end{bmatrix}$$

is a horizontal beam vector and $$v(n) = \begin{bmatrix} 1 \\ e^{-\frac{j2\pi n}{N_V}} \\ \vdots \\ e^{-\frac{j2\pi n(N_V-1)}{N_V}} \end{bmatrix}$$

represents a vertical beam vector.

In some embodiments, the same codebook is used for both polarizations. A specific codeword for polarization p is denoted as c(p,m,n).

In some embodiments, the beam space intended for covering can be encompassed by the above ranges. For $\lambda=/2$ case, full angle range $-\pi/2$ to $\pi/2$ is covered by the beams. Some of the beams in the edge can be dropped if they fall outside the beam space that can be covered.

In some embodiments, the disclosed GoB beamforming uses beamforming weights from a DFT codebook. GoB beamforming can be related to the direction of the user from the base station and is robust against the mobility of users. When the codewords are orthogonal, the proposed solution allows a tradeoff between the power than can be collected by a codeword from a user's channel and the power leaked to other users. When the codewords are not orthogonal, the proposed solution allows tradeoffs not only between the power than can be collected by a codeword, the power leaked to other users, but also the interference between the codewords for a user.

In some embodiments, with a tradeoff between the power than can be collected by a codeword, the power leaked to other users, and the interference between the codewords for a user, the selected beamforming weights guarantee optimal performance from a system perspective. In this way, spectral efficiency is maximized, which is an important consideration in the operation of wireless systems.

In some embodiments, the disclosed techniques for PDSCH beamforming weight determination can be based on the following three functionalities:
  (a) Correlation power computation to obtain the energy that can be collected by each beam direction.
  (b) Beam selection to assign beams to users so that each user's effective channel power is maximized.
  (c) Beamforming weight generation to generate the beamforming weight for PDSCH transmission.

The disclosed techniques can use the selection metrics for DFT-based codeword. In some aspects, when the codebook contains orthogonal codewords only, the proposed selection metrics include the correlation power and signal-to-leakage power ratio (SLNR). When the codebook contains spatially oversampled, and therefore non-orthogonal codewords, signal to interference and leakage power ratio (SILNR) metric is proposed to achieve the suppression of inter-layer interference of the same UE, and in the meantime, reduce leakage power to other UEs.

Correlation Power Computation

The input can be configured as $H(i)=[H_{u_0}(i), \ldots, H_{u_{K-1}}(i)]$, which is a concatenation of channels for all users from 0 to K−1 at the i-th subcarrier. For user k with $R_{u_k}$ number of receive (Rx) antennas, the dimension of its channel $H_{u_k}$ is $R_{u_k} \times 2_{pol} \times (N_H \times N_V)$. Let $H_{u_k}(i, p)$ denote the channel matrix of size $R_{u_k} \times (N_H \times N_V)$ of user $u_k$ in polarization p. C is a DFT beam codebook, and I is the number of subcarriers within a frequency bandwidth for computing PDSCH beamforming weight.

The output can be configured as $y_{corr}(u_k, p, m, n,)$, which is the correlation energy with codeword c(m, n) for user $u_k$ in polarization p.

In some aspects, the following processing algorithm can be used. The correlation power between a channel matrix at a subcarrier in polarization and a beam codeword is computed as the square of the L2 norm of their product. The correlation power is then summed over all available subcarriers to be used for beam selection. The correlation power is computed based on the following equation:

$$y_{corr}(u_k, p, m, n) = \sum_{i=0}^{I-1} \|H_{u_k}^T(i, p) \times c(p, m, n)\|^2$$

Correlation Power-Based Beam Selection

The input can be configured as $y_{corr}(u_k, p, m, n)$, which is the correlation power for each user, polarization, and codeword. In some aspects, $[M_{u_0}, \ldots, M_{u_{K-1}}]$ is a vector of integers indicating number of layers allocated to each user. The output can be configured as $$[b_{u_k,0}, \ldots, b_{u_k,M_{u_k}-1}] \text{ for } k = [0, K-1]$$

selected beams of each user.

In some aspects, the following algorithm can be used for correlation power-based beam selection. The following pseudo-code in Table 1 explains the beam selection procedure based on the correlation power. The selected beam is represented by a tuple (p*, m*, n*) that achieves the largest correlation power from a set containing beams that have not been selected before. In this procedure, the number of beams chosen from each polarization is recorded.

TABLE 1

```
selectedBeamSet = Ø, nPol(0) = 0, nPol(1) = 0
for user u_k from 0 to K − 1
    for beam indexed by j from 0 to M_{u_k} − 1 for user k
    b_{u_k,j} = c( p* , m* , n*) = max_( p,m,n) y_corr(u_k, p, m, n) with ( p, m, n)
    ∉
    selectedBeamSet
    add ( p*, m*, n*) to selectedBeamSet
    if (p* == 0)
        nPol(0) = nPol(0) + 1
    else if (p* == 1)
        nPol(1) = nPol(1) + 1
    end
    end
end
```

SLNR-Based Beam Selection

In some aspects, the signal-to-leakage power ratio (SLNR) metric not only considers the signal power collected by a beam but also its power leaked to other users.

The input can be configured as $y_{corr}(u_k, p, m, n)$, which is the correlation power for each user, polarization, and codeword. In some aspects, $[M_{u_0}, \ldots, M_{u_{K-1}}]$ is a vector of integers indicating number of layers allocated to each user. In some aspects, $[R_{u_0}, \ldots, R_{u_{K-1}}]$ is a vector of integers indicating number of layers allocated to each user. In some aspects, $\sigma^2$ is a regularization factor set to be 30 dB below the average channel power across all users and receive antennas.

In some aspects, the output can be configured as $$[b_{u_k,0}, \ldots, b_{u_k,M_{u_k}-1}] \text{ for } k = [0, K-1]$$

selected beams of each user.

In some embodiments, the SLNR-based beam selection can be based on the following processing algorithm. The SLNR achieved with codeword c(m, n) for user $u_k$ in polarization p is defined as $$y_{SLNR}(u_k, p, m, n) = \frac{\gamma_{u_k} \times y_{corr}(u_k, p, m, n)}{\sum_{k=u_0, u \neq u_k}^{u_{K-1}} (\gamma_u \times y_{corr}(u, p, m, n)) + \sigma^2}.$$

In the above equation, $$\gamma_u = \frac{M_u}{R_u}$$

is the normalization factor for user u and $y_{corr}(u_k, p, m, n)$ is the correlation energy achieved with codeword c(m, n) for user $u_k$ in polarization p.

In some aspects, the following pseudo-code listed in Table 2 explains the beam selection procedure based on the SLNR. The selected beam is represented by a tuple (p*, m*, n*) that achieves the largest SLNR from a set containing beams that have not been selected before. In this procedure, the number of beams chosen from each polarization is recorded.

TABLE 2

```
selectedBeamSet = Ø, nPol(0) = 0, nPol(1) = 0
for user u_k from 0 to K − 1
    for beam indexed by j from 0 to M_{u_k} − 1 for user k
    b_{u_k,j} = c( p*, m*, n*) = max_( p,m,n) y_SLNR(u_k, p, m, n) with ( p, m, n)
    ∉
    selectedBeamSet
    add ( p*, m*, n*) to selectedBeamSet
    if (p* == 0)
        nPol(0) = nPol(0) + 1
    else if (p* == 1)
        nPol(1) = nPol(1) + 1
    end
    end
end
```

SILNR-Based Beam Selection with Spatially Oversampled DFT Codebook

In some aspects, the signal-to-interference and leakage power ratio (SILNR) metric not only considers the signal power collected by a beam but also its power leaked to other users, when a user is to be assigned multiple beams, the interference between a candidate beam under evaluation and those beams already assigned to such a user. The interference between two beams within the same polar value, denoted as c(p,m,n) and c(p,m',n'), is computed as i(c(p,m,n),c(p,m',n'))=$|c^H(p,m,n) \times c(p,m',n')|^2$. In some aspects, the interference between two beams across the two polarizations is zero, and the interference between two orthogonal beams from the same polarization is zero.

The input for this processing can be configured as $y_{corr}(u_k,p,m,n)$, which is the correlation power for each user, polarization, and codeword. In some aspects, $[M_{u_0}, \ldots, M_{u_{K-1}}]$ is a vector of integers indicating number of layers allocated to each user. In some aspects, $[R_{u_0}, \ldots, R_{u_{K-1}}]$ is a vector of integers indicating number of layers allocated to each user. In some aspects, $\sigma^2$ is a regularization factor set to be 30 dB below the average channel power across all users and receive antennas. In some aspects, i(c(p,m,n),c(p',m', n')) is the interference between any pair of beam codewords.

In some embodiments, the output can be configured as $$[b_{u_k,0}, \ldots, b_{u_k,M_{u_k}-1}] \text{ for } k = [0, K-1]$$

selected beams of each user.

In some embodiments, the SILNR-based beam selection can be based on the following processing algorithm. The SILNR can be achieved with codeword c(m, n) for user $u_k$ in polarization p, and is defined as $$y_{SILNR}(u_k, p, m, n) = \frac{\beta(nPol(p)) \times y_{corr}(u_k, p, m, n)}{\sum_{u=u_0, u \neq u_k}^{u_{K-1}} (\gamma_u \times y_{corr}(u, p, m, n)) + \sum_{w \in selectedBeamSet(u_k)} i(c(p, m, n), w) + \sigma^2}$$

In the above equation, $$\gamma_u = \frac{M_u}{R_u}$$

is the normalization factor for user u, $y_{corr}(u_k,p,m,n)$ is the correlation energy achieved with codeword c(m, n) for user $u_k$ in polarization p, and selectedBeamSet($u_k$) is the set of beamforming weights that have been selected for user $u_k$. The term $\Sigma_{w \in selectedBeamSet(u_k)}$i(c(p,m,n), w) reflects the interference between a candidate beam c(p,m,n) under evaluation and those beams already assigned to $u_k$, which are included in the set of selected beam denoted as selectedBeamSet($u_k$). β(nPol(p))=1 is used when considering the total transmit power from two polarization being constrained. On the other hand, $$\beta(nPol(p)) = \frac{1}{nPol(p)+1}$$

is used when considering the transmit power from each polarization being constrained to encourage selecting beams from the polarization from which fewer beams have been selected.

The following pseudo-code listed in Table 3 explains the beam selection procedure based on the SILNR. The selected beam is represented by a tuple (p*, m*, n*) that achieves the largest SILNR. In this procedure, the number of beams chosen from each polarization is recorded.

TABLE 3

```
nPol(0) = 0, nPol(1) = 0
for user u_k from 0 to K − 1
    selectedBeamSet(u_k) = ∅,
    for beam indexed by j from 0 to M_{u_k} − 1 for user k
    b_{u_k,j} = c( p*, m*, n*) = max_{(p,m,n)} y_{SILNR}(u_k, p, m, n)
    add (p*, m*, n*) to selectedBeamSet(u_k)
    if (p* == 0)
        nPol(0) = nPol(0) + 1
    else if (p* == 1)
        nPol(1) = nPol(1) + 1
    end
        end
end
```

Beamforming Weight Generation

The input for this functionality can be configured as $$[b_{u_k,0}, \ldots, b_{u_k,M_{u_k}-1}] \text{ for } k = [0, K-1]$$

selected beams of each user $u_k$. In some aspects, nPol(0) is the number of the selected beams across all users from polarization 0. In some aspects, nPol(1) is the number of the selected beams across all users from polarization 1.

In some embodiments, the output can be configured as $$[w_{u_k,0}, \ldots, w_{u_k,M_{u_k}-1}] \text{ for } k = [0, K-1]$$

generated PDSCH beamforming weight for user $u_k$.

In some embodiments, the following algorithm can be used in connection with beamforming weight generation. A PDSCH beamforming weight vector is the scaled version of the corresponding selected beam based on the total number of selected beams from the corresponding polarization. An example weight vector is provided by the following equation:

$$w_{u_k,j} = \frac{1}{\sqrt{nPol(p^*)}} c(p^*, m^*, n^*).$$

In some embodiments, the PDSCH beamforming weight matrix for a user is formed by concatenating all the beamforming weight vectors of such a user.

In some aspects, the disclosed beam selection techniques are based on the power of the correlation, which is robust against channel variation. When channel variation is small, other beamforming methods (e.g., zero-forcing and regularized zero-forcing) that utilize the phases may be added after beam selection to eliminate the interference. In such a case, the resulting effective channel becomes $H_{eff}(i)=H(i)W_{beam}W_{zf}$. In some embodiments, $W_{zf}$ is the inverse of the matrix $H(i)W_{beam}$ on subcarrier i when it is an inverseable square matrix.

Figure 16:
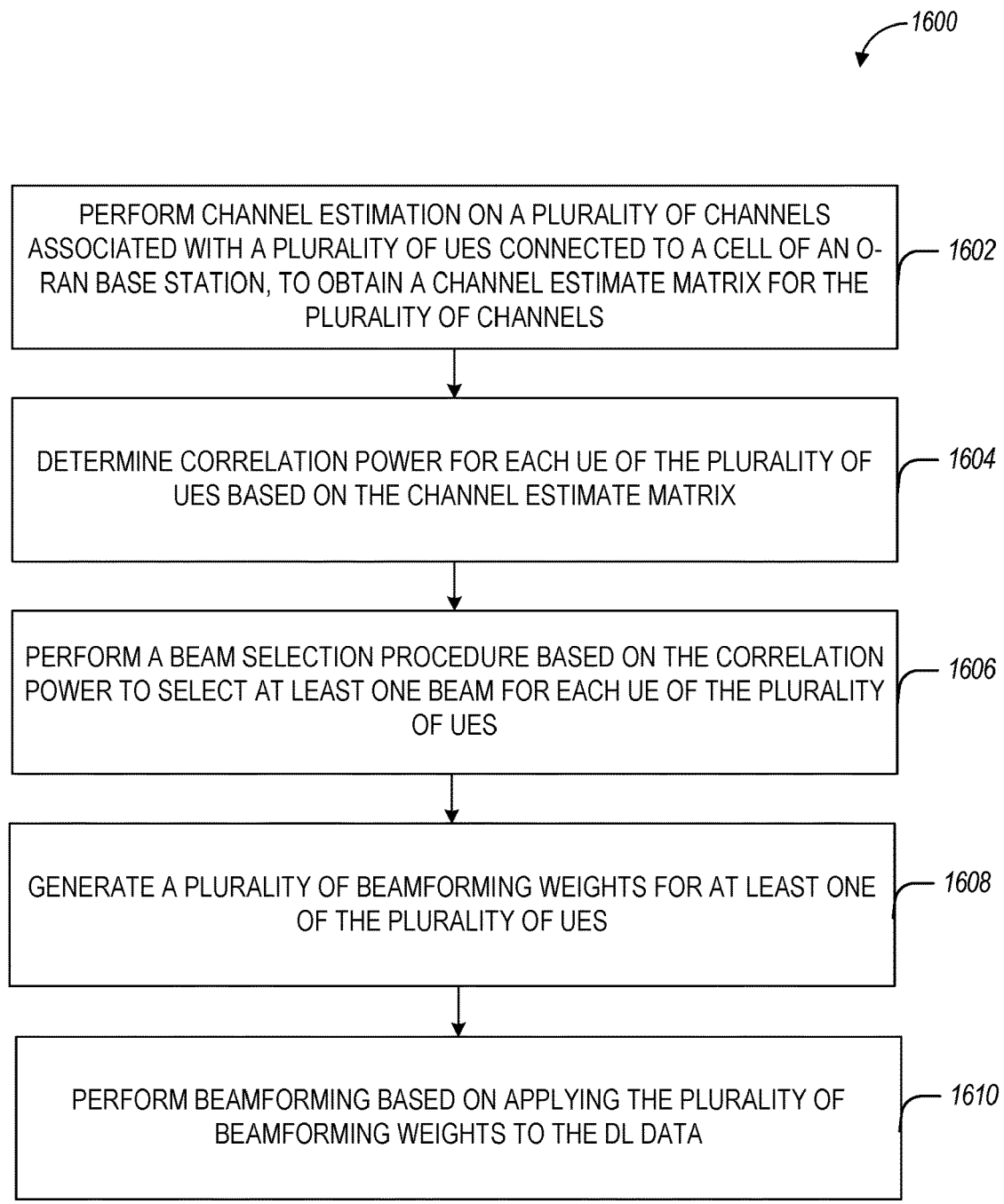
FIG. 16 is a flow diagram illustrating a method for beamforming in a wireless system, in accordance with some aspects.

FIG. 16 is a flow diagram illustrating method 1600 for beamforming in a wireless system, in accordance with some aspects. Method 1600 can be performed by processing circuitry of a base station (e.g., communication device 1700 may be a base station, and method 1700 or any other functionality disclosed herein can be performed by processor 1702). In some aspects, method 1600 is based on the beamforming techniques used during the processing of DL data, as described in connection with FIG. 12-FIG. 15.

At operation 1602, channel estimation is performed (e.g., by channel estimation circuitry 1218) on a plurality of channels associated with a plurality of user equipments (UEs) connected to a cell of an O-RAN base station (e.g., base station architecture 1200), to obtain a channel estimate matrix for the plurality of channels.

At operation 1604, correlation power is determined for each UE of the plurality of UEs based on the channel estimate matrix.

At operation 1606, a beam selection procedure is performed based on the correlation power to select at least one beam for each UE of the plurality of UEs.

At operation 1608, a plurality of beamforming weights (e.g., weights 1222) are generated for at least one of the plurality of UEs.

At operation 1610, beamforming is performed based on applying the plurality of beamforming weights to DL data.

Figure 17:
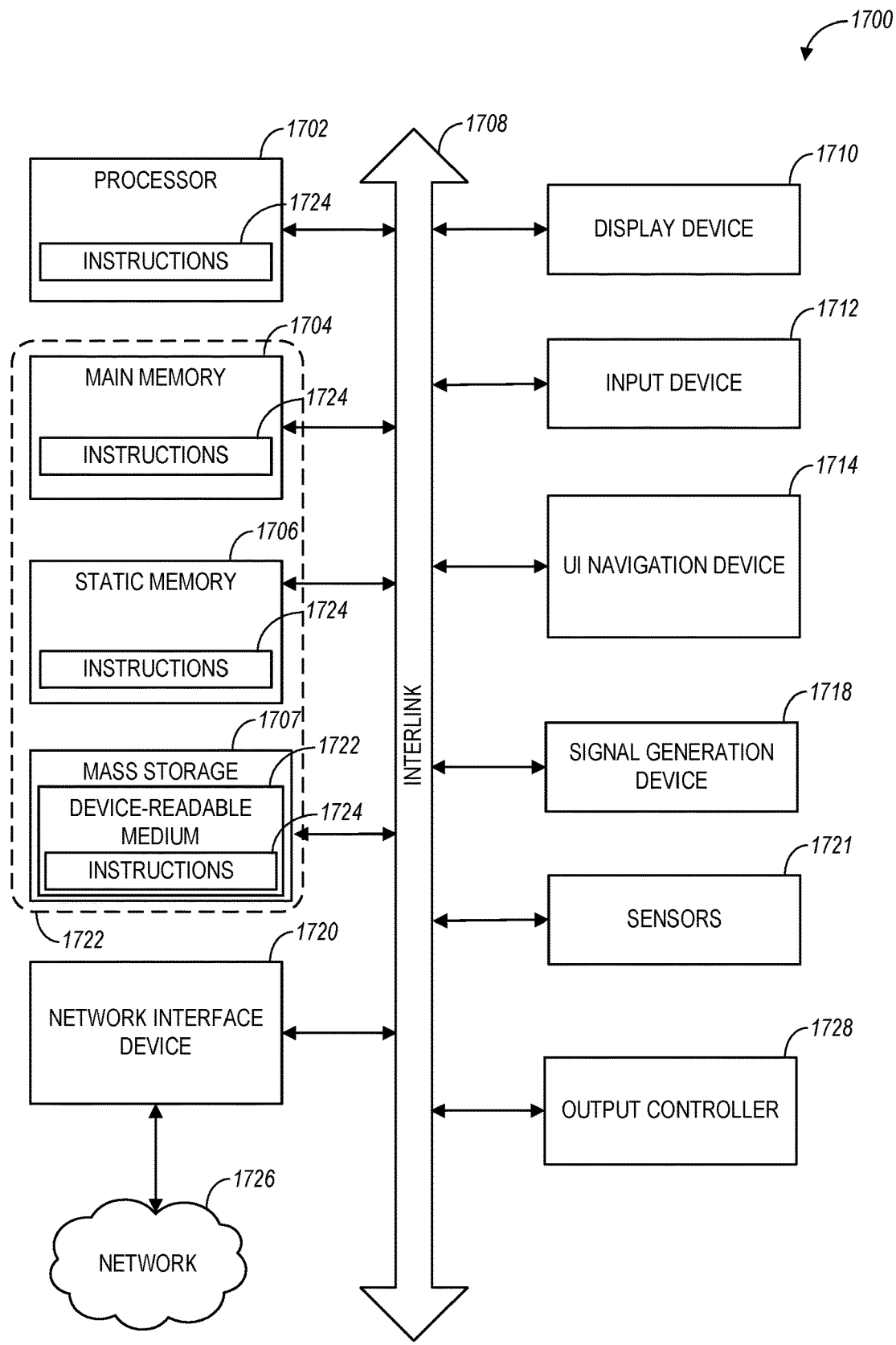
FIG. 17 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects.

FIG. 17 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects and to perform one or more of the techniques disclosed herein. In alternative aspects, the communication device 1700 may operate as a standalone device or may be connected (e.g., networked) to other communication devices.

Circuitry (e.g., processing circuitry) is a collection of circuits implemented in tangible entities of the device 1700 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1700 follow.

In some aspects, the device 1700 may operate as a standalone device or may be connected (e.g., networked) to other devices. In a networked deployment, the communication device 1700 may operate in the capacity of a server communication device, a client communication device, or both in server-client network environments. In an example, the communication device 1700 may act as a peer communication device in a peer-to-peer (P2P) (or other distributed) network environment. The communication device 1700 may be a UE, eNB, PC, a tablet PC, an STB, a PDA, mobile telephone, a smartphone, a web appliance, network router, a switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or several components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1700 may include a hardware processor 1702 (e.g., a central processing unit (CPU), a graphics processing unit (GPU), a hardware processor core, or any combination thereof), a main memory 1704, a static memory 1706, and mass storage 1707 (e.g., hard drive, tape drive, flash storage, or other block or storage devices), some or all of which may communicate with each other via an interlink (e.g., bus) 1708.

The communication device 1700 may further include a display device 1710, an alphanumeric input device 1712 (e.g., a keyboard), and a user interface (UI) navigation device 1714 (e.g., a mouse). In an example, the display device 1710, input device 1712, and UI navigation device 1714 may be a touchscreen display. The communication device 1700 may additionally include a signal generation device 1718 (e.g., a speaker), a network interface device 1720, and one or more sensors 1721, such as a global positioning system (GPS) sensor, compass, accelerometer, or another sensor. The communication device 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1707 may include a communication device-readable medium 1722, on which is stored one or more sets of data structures or instructions 1724 (e.g., software) embodying or utilized by any one or more of the techniques or functions described herein. In some aspects, registers of the processor 1702, the main memory 1704, the static memory 1706, and/or the mass storage 1707 may be, or include (completely or at least partially), the device-readable medium 1722, on which is stored the one or more sets of data structures or instructions 1724, embodying or utilized by any one or more of the techniques or functions described herein. In an example, one or any combination of the hardware processor 1702, the main memory 1704, the static memory 1706, or the mass storage 1707 may constitute the device-readable medium 1722.

As used herein, the term "device-readable medium" is interchangeable with "computer-readable medium" or "machine-readable medium". While the communication device-readable medium 1722 is illustrated as a single medium, the term "communication device-readable medium" may include a single medium or multiple media (e.g., a centralized or distributed database, and/or associated caches and servers) configured to store the one or more instructions 1724. The term "communication device-readable medium" is inclusive of the terms "machine-readable medium" or "computer-readable medium", and may include any medium that is capable of storing, encoding, or carrying instructions (e.g., instructions 1724) for execution by the communication device 1700 and that causes the communication device 1700 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1724 may further be transmitted or received over a communications network 1726 using a transmission medium via the network interface device 1720 utilizing any one of several transfer protocols. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one single-input-multiple-output (SIMO), MIMO, or multiple-input-single-output (MISO) techniques. In some examples, the network interface device 1720 may wirelessly communicate using Multiple User MIMO techniques.

The term "transmission medium" shall be taken to include any intangible medium that is capable of storing, encoding, or carrying instructions for execution by the communication device 1700, and includes digital or analog communications signals or another intangible medium to facilitate communication of such software. In this regard, a transmission medium in the context of this disclosure is a device-readable medium.

Example aspects of the present disclosure are further disclosed hereinbelow.

Example 1 is an apparatus for use in an Open Radio Access Network (O-RAN) base station, the apparatus comprising: processing circuitry, wherein to configure the O-RAN base station for signal processing in an O-RAN network, the processing circuitry is to: decode a sounding reference signal (SRS) and a demodulation reference signal (DMRS) in an uplink (UL) stream received from at least one user equipment (UE); perform channel estimation based on the SRS to obtain a channel estimate matrix of channel estimates associated with reception of the UL stream; generate a noise covariance using the DMRS, the noise covariance associated with the UL stream; determine beamforming weights using the channel estimate matrix and the noise covariance; and perform beamforming on UL data corresponding to the UL stream to generate beamformed data streams, the beamforming based on applying the beamforming weights to the UL data; and a memory coupled to the processing circuitry and configured to store the beamforming weights.

In Example 2, the subject matter of Example 1 includes subject matter where the processing circuitry is to: generate multiple orthogonal frequency division multiplexing (OFDM) symbols corresponding to the UL stream; and perform resource element de-mapping to generate the UL data, the SRS, and the DMRS.

In Example 3, the subject matter of Examples 1-2 includes subject matter where the processing circuitry is to: generate a noise and interference vector estimate based on the DMRS.

In Example 4, the subject matter of Example 3 includes subject matter where the processing circuitry is to: perform averaging of the noise and interference vector estimate over frequency to obtain a first average noise and interference vector estimate.

In Example 5, the subject matter of Example 4 includes subject matter where the processing circuitry is to: select the frequency to cover a frequency range comprising one of a resource block group (RBG) or a channel bandwidth used for receiving the UL stream.

In Example 6, the subject matter of Examples 4-5 includes subject matter where the processing circuitry is to: perform averaging of the noise and interference vector estimate over time to obtain a second average noise and interference vector estimate.

In Example 7, the subject matter of Example 6 includes subject matter where the processing circuitry is to: generate the noise covariance based on the first average noise and interference vector estimate and the second average noise and interference vector estimate.

In Example 8, the subject matter of Examples 1-7 includes subject matter where the processing circuitry is to: calculate a plurality of matched filter weights using the channel estimate matrix of channel estimates; and determine the beamforming weights based on applying the noise covariance to the plurality of matched filter weights.

In Example 9, the subject matter of Examples 1-8 includes, split.

In Example 10, the subject matter of Example 9 includes subject matter where the processing circuitry is to: determine the beamforming weights at the O-DU; and perform the beamforming at the O-RU.

Example 11 is a method for beamforming in an O-RAN network, the method includes performing channel estimation on a plurality of channels associated with a plurality of user equipments (UEs) connected to a cell of the O-RAN base station, to obtain a channel estimate matrix for the plurality of channels; determining correlation power for each UE of the plurality of UEs based on the channel estimate matrix; perform a beam selection procedure based on the correlation power to select at least one beam for each UE of the plurality of UEs; generating a plurality of beamforming weights for at least one of the plurality of UEs; and performing beamforming based on applying the plurality of beamforming weights to the DL data.

In Example 12, the subject matter of Example 11 includes subject matter where the beam selection procedure is a signal-to-noise-and-leakage-ratio (SLNR)-based beam selection procedure, and wherein the method further includes selecting the at least one beam based on calculating a normalization factor, the normalization factor for a UE of the plurality of UEs comprising a ratio of a first vector of integers indicating a number of layers allocated to the UE and a second vector of integers indicating a number of layers allocated to the UE.

Example 13 is a non-transitory computer-readable storage medium that stores instructions for execution by one or more processors of an Open Radio Access Network (O-RAN) base station, the instructions to configure the O-RAN base station for uplink (UL) communications in an O-RAN network, and to cause the O-RAN base station to: decode a sounding reference signal (SRS) and a demodulation reference signal (DMRS) in an uplink (UL) stream received from at least one user equipment (UE); perform channel estimation based on the SRS to obtain a channel estimate matrix of channel estimates associated with reception of the UL stream; generate a noise covariance using the DMRS, the noise covariance associated with the UL stream; determine beamforming weights using the channel estimate matrix and the noise covariance; and perform beamforming on UL data corresponding to the UL stream to generate beamformed data streams, the beamforming based on applying the beamforming weights to the UL data.

In Example 14, the subject matter of Example 13 includes subject matter where the instructions further cause the O-RAN base station to: generate multiple orthogonal frequency division multiplexing (OFDM) symbols corresponding to the UL stream; and perform resource element de-mapping to generate the UL data, the SRS, and the DMRS.

In Example 15, the subject matter of Examples 13-14 includes subject matter where the instructions further cause the O-RAN base station to: generate a noise and interference vector estimate based on the DMRS.

In Example 16, the subject matter of Example 15 includes subject matter where the instructions further cause the O-RAN base station to: perform averaging of the noise and interference vector estimate over frequency to obtain a first average noise and interference vector estimate.

In Example 17, the subject matter of Example 16 includes subject matter where the instructions further cause the O-RAN base station to: select the frequency to cover a frequency range comprising one of a resource block group (RBG) or a channel bandwidth used for receiving the UL stream.

In Example 18, the subject matter of Examples 16-17 includes subject matter where the instructions further cause the O-RAN base station to: perform averaging of the noise and interference vector estimate over time to obtain a second average noise and interference vector estimate.

In Example 19, the subject matter of Example 18 includes subject matter where the instructions further cause the O-RAN base station to: generate the noise covariance based on the first average noise and interference vector estimate and the second average noise and interference vector estimate.

In Example 20, the subject matter of Examples 13-19 includes subject matter where the instructions further cause the O-RAN base station to: calculate a plurality of matched filter weights using the channel estimate matrix of channel estimates; and determine the beamforming weights based on applying the noise covariance to the plurality of matched filter weights.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although example aspects have been described herein, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for use in an Open Radio Access Network (O-RAN) base station, the apparatus comprising:
   processing circuitry, wherein to configure the O-RAN base station for signal processing in an O-RAN network, the processing circuitry is to:
   decode a sounding reference signal (SRS) and a demodulation reference signal (DMRS) in an uplink (UL) stream received from at least one user equipment (UE);
   predict, based on a plurality of past SRS channel estimates corresponding to the SRS, a current SRS-based channel estimate for the UL stream;
   calculate a plurality of matched filter weights using the current SRS-based channel estimate;
   perform channel estimation based on the SRS to obtain a channel estimate matrix of channel estimates associated with reception of the UL stream;
   generate a noise covariance using the DMRS, the noise covariance associated with the UL stream;
   apply a noise pre-whitening operation to the plurality of matched filter weights to obtain noise pre-whitened matched filter weights, the noise pre-whitening operation based on an inverse of the noise covariance;
   determine beamforming weights as the noise pre-whitened matched filter weights; and
   perform beamforming on UL data corresponding to the UL stream to generate beamformed data streams, the beamforming based on applying the beamforming weights to the UL data; and a memory coupled to the processing circuitry and configured to store the beamforming weights.

2. The apparatus of claim 1, wherein the processing circuitry is to:
generate multiple orthogonal frequency division multiplexing (OFDM) symbols corresponding to the UL stream; and
perform resource element de-mapping to generate the UL data, the SRS, and the DMRS.

3. The apparatus of claim 1, wherein the processing circuitry is to:
generate a noise and interference vector estimate based on the DMRS.

4. The apparatus of claim 3, wherein the processing circuitry is to:
perform averaging of the noise and interference vector estimate over frequency to obtain a first average noise and interference vector estimate.

5. The apparatus of claim 4, wherein the processing circuitry is to:
select the frequency to cover a frequency range comprising one of a resource block group (RBG) or a channel bandwidth used for receiving the UL stream.

6. The apparatus of claim 4, wherein the processing circuitry is to:
perform averaging of the noise and interference vector estimate over time to obtain a second average noise and interference vector estimate.

7. The apparatus of claim 6, wherein the processing circuitry is to:
generate the noise covariance based on the first average noise and interference vector estimate and the second average noise and interference vector estimate.

8. The apparatus of claim 1, wherein the processing circuitry is to:
calculate a plurality of matched filter weights using the channel estimate matrix of channel estimates; and
determine the beamforming weights based on applying the noise covariance to the plurality of matched filter weights.

9. The apparatus of claim 1, wherein the base station is an O-RAN base station comprising an O-RAN radio unit (O-RU) and an O-RAN distributed unit (O-DU), and wherein the O-DU and the O-RU are partitioned according to a 7-2 split.

10. The apparatus of claim 9, wherein the processing circuitry is to:
determine the beamforming weights at the O-DU; and
perform the beamforming at the O-RU.

11. A method for beamforming in an O-RAN network, the method comprising:
performing channel estimation on a plurality of channels associated with a plurality of user equipments (UEs) connected to a cell of an O-RAN base station, to obtain a channel estimate matrix for the plurality of channels;
for at least one UE, predicting, based on a plurality of past SRS channel estimates, a current SRS-based channel estimate for an uplink (UL) stream;
calculating a plurality of matched filter weights using the current SRS-based channel estimate;
generating a noise covariance using a DMRS associated with the UL stream;
applying a noise pre-whitening operation to the plurality of matched filter weights to obtain noise pre-whitened matched filter weights, the noise pre-whitening operation based on an inverse of the noise covariance;
determining a plurality of beamforming weights as the noise pre-whitened matched filter weights; and
performing beamforming based on applying the plurality of beamforming weights to the downlink (DL) data.

12. The method of claim 11, further comprising:
selecting at least one beam associated with the beamforming based on calculating a normalization factor, the normalization factor for a UE of the plurality of UEs comprising a ratio of a first vector of integers indicating a number of layers allocated to the UE and a second vector of integers indicating a number of layers allocated to the UE.

13. A non-transitory computer-readable storage medium that stores instructions for execution by one or more processors of an Open Radio Access Network (O-RAN) base station, the instructions to configure the O-RAN base station for uplink (UL) communications in an O-RAN network, and to cause the O-RAN base station to:
decode a sounding reference signal (SRS) and a demodulation reference signal (DMRS) in an uplink (UL) stream received from at least one user equipment (UE);
predict, based on a plurality of past SRS channel estimates corresponding to the SRS, a current SRS-based channel estimate for the UL stream;
calculate a plurality of matched filter weights using the current SRS-based channel estimate;
perform channel estimation based on the SRS to obtain a channel estimate matrix of channel estimates associated with reception of the UL stream;
generate a noise covariance using the DMRS, the noise covariance associated with the UL stream;
apply a noise pre-whitening operation to the plurality of matched filter weights to obtain noise pre-whitened matched filter weights, the noise pre-whitening operation based on an inverse of the noise covariance;
determine beamforming weights as the noise pre-whitened matched filter weights; and
perform beamforming on UL data corresponding to the UL stream to generate beamformed data streams, the beamforming based on applying the beamforming weights to the UL data.

14. The non-transitory computer-readable storage medium of claim 13, wherein the instructions further cause the O-RAN base station to:
generate multiple orthogonal frequency division multiplexing (OFDM) symbols corresponding to the UL stream; and
perform resource element de-mapping to generate the UL data, the SRS, and the DMRS.

15. The non-transitory computer-readable storage medium of claim 13, wherein the instructions further cause the O-RAN base station to:
generate a noise and interference vector estimate based on the DMRS.

16. The non-transitory computer-readable storage medium of claim 15, wherein the instructions further cause the O-RAN base station to:
perform averaging of the noise and interference vector estimate over frequency to obtain a first average noise and interference vector estimate.

17. The non-transitory computer-readable storage medium of claim 16, wherein the instructions further cause the O-RAN base station to:
select the frequency to cover a frequency range comprising one of a resource block group (RBG) or a channel bandwidth used for receiving the UL stream.

18. The non-transitory computer-readable storage medium of claim 16, wherein the instructions further cause the O-RAN base station to:
perform averaging of the noise and interference vector estimate over time to obtain a second average noise and interference vector estimate.

19. The non-transitory computer-readable storage medium of claim 18, wherein the instructions further cause the O-RAN base station to:
generate the noise covariance based on the first average noise and interference vector estimate and the second average noise and interference vector estimate.

20. The non-transitory computer-readable storage medium of claim 13, wherein the instructions further cause the O-RAN base station to:
calculate a plurality of matched filter weights using the channel estimate matrix of channel estimates; and
determine the beamforming weights based on applying the noise covariance to the plurality of matched filter weights.

* * * * *